(12) United States Patent
Pinard et al.

(10) Patent No.: US 8,160,348 B2
(45) Date of Patent: Apr. 17, 2012

(54) METHODS AND SYSTEM FOR VALIDATING SAMPLE IMAGES FOR QUANTITATIVE IMMUNOASSAYS

(75) Inventors: Robert Pinard, New Haven, CT (US); Gregory R. Tedeschi, Cromwell, CT (US); Christine Williams, Middletown, CT (US); Dongxiao Wang, Orange, CT (US)

(73) Assignee: HistoRx, Inc., Branford, CT (US)

( * ) Notice: Subject to any disclaimer, the term of this patent is extended or adjusted under 35 U.S.C. 154(b) by 895 days.

(21) Appl. No.: 12/186,294

(22) Filed: Aug. 5, 2008

(65) Prior Publication Data

US 2009/0074282 A1   Mar. 19, 2009

Related U.S. Application Data

(60) Provisional application No. 60/954,303, filed on Aug. 6, 2007.

(30) Foreign Application Priority Data

Sep. 26, 2007  (CA) ..................................... 2604317

(51) Int. Cl.
  *G06K 9/00* (2006.01)
  *H04N 7/18* (2006.01)
(52) U.S. Cl. ............................ 382/133; 382/128; 349/79
(58) Field of Classification Search .................. 382/128, 382/133; 348/79
  See application file for complete search history.

(56) References Cited

U.S. PATENT DOCUMENTS

| | | | |
|---|---|---|---|
| 4,480,189 A | 10/1984 | Miyake et al. | |
| 4,859,062 A | 8/1989 | Thurn et al. | |
| 4,892,817 A | 1/1990 | Pawlak | |
| 4,904,088 A | 2/1990 | Blazek et al. | |
| 4,910,398 A | 3/1990 | Komatsu et al. | |
| 4,912,034 A | 3/1990 | Kalra et al. | |
| 4,927,266 A | 5/1990 | Sugiura et al. | |
| 5,068,909 A | 11/1991 | Rutherford et al. | |

(Continued)

FOREIGN PATENT DOCUMENTS

EP  0709667  5/1996

(Continued)

OTHER PUBLICATIONS

A.K. Jain et al, "Data Clustering: A Review", ACM Computing Surveys, vol. 31, No. 3, Sep. 1999, pp. 264-323.

(Continued)

*Primary Examiner* — Rodney Fuller
(74) *Attorney, Agent, or Firm* — Gilberto M. Villacorta; Daniel R. Shelton; Foley & Lardner LLP

(57) ABSTRACT

A method and system for automatically evaluating quality of a slide-mounted tissue sample includes receiving a digital image of a magnified portion of the slide-mounted tissue sample. At least one quantitative quality indicator is automatically determined for at least one of the samples, and the digital image of the magnified portion of the sample. Each of the quantitative quality indicators is automatically compared to a respective minimum acceptable quality threshold. The quantitative quality indicators and associated quality thresholds are selected for suitability with an automated quantitative immunoassay. Failure of one or more of the quantitative quality indicators to meet its respective minimum acceptable quality threshold suggests that the sample is unsuitable for subsequent automated pathological evaluation. Results can be examined at a user interface allowing for user inspection of samples determined to be unsuitable, the user interface also having provisions for manual override of the determination.

16 Claims, 15 Drawing Sheets

U.S. PATENT DOCUMENTS

| | | | |
|---|---|---|---|
| 5,070,455 A | 12/1991 | Singer et al. | |
| 5,097,119 A | 3/1992 | Breitmeier | |
| 5,115,673 A | 5/1992 | Kline et al. | |
| 5,126,577 A | 6/1992 | Trent | |
| 5,244,787 A | 9/1993 | Key et al. | |
| 5,254,845 A | 10/1993 | Burgess et al. | |
| 5,422,018 A | 6/1995 | Saunders et al. | |
| 5,427,910 A | 6/1995 | Kamentsky et al. | |
| 5,432,054 A | 7/1995 | Saunders et al. | |
| 5,439,649 A | 8/1995 | Tseung et al. | |
| 5,489,386 A | 2/1996 | Saunders | |
| 5,492,837 A | 2/1996 | Naser-Kolahzadeh et al. | |
| 5,523,207 A | 6/1996 | Kamentsky et al. | |
| 5,561,556 A | 10/1996 | Weissman | |
| 5,578,452 A | 11/1996 | Shi et al. | |
| 5,587,833 A | 12/1996 | Kamentsky | |
| 5,602,674 A | 2/1997 | Weissman et al. | |
| 5,633,945 A | 5/1997 | Kamentsky | |
| 5,672,881 A | 9/1997 | Striepeke et al. | |
| 5,682,567 A | 10/1997 | Spruck et al. | |
| 5,694,212 A | 12/1997 | Weissman | |
| 5,717,198 A | 2/1998 | Broude et al. | |
| 5,731,156 A | 3/1998 | Golbus | |
| 5,784,529 A | 7/1998 | Richmond | |
| 5,880,473 A | 3/1999 | Ginestet | |
| 5,885,840 A | 3/1999 | Kamentsky et al. | |
| 5,889,881 A | 3/1999 | MacAulay et al. | |
| 5,916,750 A | 6/1999 | Iyer et al. | |
| 5,948,359 A | 9/1999 | Kalra et al. | |
| 5,962,234 A | 10/1999 | Golbus | |
| 5,978,497 A | 11/1999 | Lee et al. | |
| 6,002,788 A | 12/1999 | Luther | |
| 6,026,174 A | 2/2000 | Palcic et al. | |
| 6,031,930 A | 2/2000 | Bacus et al. | |
| 6,052,190 A | 4/2000 | Sekowski et al. | |
| 6,087,134 A | 7/2000 | Saunders | |
| 6,101,265 A | 8/2000 | Bacus et al. | |
| 6,130,323 A | 10/2000 | Su et al. | |
| 6,134,354 A | 10/2000 | Lee et al. | |
| 6,137,899 A | 10/2000 | Lee et al. | |
| 6,151,405 A | 11/2000 | Douglass et al. | |
| 6,165,739 A | 12/2000 | Clatch | |
| 6,169,816 B1 | 1/2001 | Ravkin | |
| 6,215,892 B1 | 4/2001 | Douglass et al. | |
| 6,221,607 B1 | 4/2001 | Tsipouras et al. | |
| 6,225,636 B1 | 5/2001 | Ginestet | |
| 6,226,392 B1 | 5/2001 | Bacus et al. | |
| 6,239,868 B1 | 5/2001 | Jung et al. | |
| 6,259,807 B1 | 7/2001 | Ravkin | |
| 6,270,971 B1 | 8/2001 | Ferguson-Smith et al. | |
| 6,272,235 B1 | 8/2001 | Bacus et al. | |
| 6,330,349 B1 | 12/2001 | Hays et al. | |
| 6,396,941 B1 | 5/2002 | Bacus et al. | |
| 6,404,906 B2 | 6/2002 | Bacus et al. | |
| 6,404,916 B1 | 6/2002 | De La Torre-Bueno | |
| 6,418,236 B1 | 7/2002 | Ellis et al. | |
| 6,445,817 B1 | 9/2002 | De La Torre-Bueno | |
| 6,451,551 B1 | 9/2002 | Zhan et al. | |
| 6,466,690 B2* | 10/2002 | Bacus et al. | 382/133 |
| 6,493,460 B1 | 12/2002 | MacAulay et al. | |
| 6,495,106 B1 | 12/2002 | Kalra et al. | |
| 6,518,554 B1 | 2/2003 | Zhang | |
| 6,522,744 B1 | 2/2003 | Chiang | |
| 6,524,798 B1 | 2/2003 | Goldbard et al. | |
| 6,546,123 B1 | 4/2003 | McLaren et al. | |
| 6,553,135 B1 | 4/2003 | Douglass et al. | |
| 6,589,792 B1 | 7/2003 | Malachowski | |
| 6,631,203 B2 | 10/2003 | Ellis et al. | |
| 6,632,598 B1 | 10/2003 | Zhang et al. | |
| 6,633,662 B2 | 10/2003 | Ravkin | |
| 6,671,393 B2 | 12/2003 | Hays et al. | |
| 6,674,058 B1 | 1/2004 | Miller | |
| 6,674,896 B1 | 1/2004 | Torre-Bueno | |
| 6,697,509 B2 | 2/2004 | De La Torre-Bueno | |
| 6,718,053 B1 | 4/2004 | Ellis et al. | |
| 6,746,873 B1 | 6/2004 | Buchanan et al. | |
| 6,777,194 B1 | 8/2004 | Gerdes et al. | |
| 6,780,377 B2 | 8/2004 | Hall et al. | |
| 6,800,249 B2 | 10/2004 | De al Torre-Bueno | |
| 6,876,760 B1 | 4/2005 | Vaisberg et al. | |
| 6,881,580 B2 | 4/2005 | Hall et al. | |
| 6,882,873 B2 | 4/2005 | Samuels et al. | |
| 6,900,426 B2 | 5/2005 | Zhang | |
| 6,920,239 B2 | 7/2005 | Douglass et al. | |
| 6,947,583 B2 | 9/2005 | Ellis et al. | |
| 7,006,680 B2 | 2/2006 | Gulati | |
| 7,024,316 B1 | 4/2006 | Ellison et al. | |
| 7,064,829 B2 | 6/2006 | Li et al. | |
| 7,070,951 B2 | 7/2006 | Zhang et al. | |
| 7,084,386 B2 | 8/2006 | Bernardini et al. | |
| 7,113,205 B2 | 9/2006 | Cappellaro | |
| 7,116,354 B2 | 10/2006 | Rice et al. | |
| 7,123,756 B2 | 10/2006 | Hakamata et al. | |
| 7,129,053 B1 | 10/2006 | Reiter et al. | |
| 7,133,543 B2 | 11/2006 | Verwoerd et al. | |
| 7,133,545 B2 | 11/2006 | Douglass et al. | |
| 7,146,062 B2 | 12/2006 | De La Torre-Bueno et al. | |
| 7,171,054 B2 | 1/2007 | Fiete et al. | |
| 7,177,454 B2 | 2/2007 | McLaren et al. | |
| 7,190,818 B2 | 3/2007 | Ellis et al. | |
| 7,199,360 B1 | 4/2007 | Montagu | |
| 7,212,660 B2 | 5/2007 | Wetzel et | |
| 7,219,016 B2 | 5/2007 | Rimm et al. | |
| 7,224,470 B2 | 5/2007 | Vaux et al. | |
| 7,224,839 B2 | 5/2007 | Zeineh | |
| 7,229,774 B2 | 6/2007 | Chinnaiyan et al. | |
| 7,233,340 B2 | 6/2007 | Hughes et al. | |
| 7,236,623 B2 | 6/2007 | Chapoulaud et al. | |
| 7,257,267 B2 | 8/2007 | Recht | |
| 7,272,252 B2 | 9/2007 | De La Torre-Bueno et al. | |
| 7,316,907 B2 | 1/2008 | Yu et al. | |
| 7,332,290 B2 | 2/2008 | Rubin et al. | |
| 7,369,696 B2 | 5/2008 | Arini et al. | |
| 7,376,256 B2 | 5/2008 | Kirsch et al. | |
| 7,383,134 B2 | 6/2008 | Piper et al. | |
| 7,474,777 B2* | 1/2009 | Kirsch et al. | 382/129 |
| 7,474,847 B2 | 1/2009 | Nikkanen et al. | |
| 7,639,350 B2 | 12/2009 | Noguchi et al. | |
| 2002/0141049 A1 | 10/2002 | Masuyama | |
| 2003/0138827 A1 | 7/2003 | Kononen et al. | |
| 2003/0215936 A1 | 11/2003 | Kallioniemi et al. | |
| 2004/0014165 A1* | 1/2004 | Keidar et al. | 435/40.5 |
| 2004/0056966 A1 | 3/2004 | Schechner et al. | |
| 2004/0085475 A1 | 5/2004 | Skow et al. | |
| 2004/0215087 A1 | 10/2004 | Genero et al. | |
| 2005/0037406 A1 | 2/2005 | De La Torre-Bueno et al. | |
| 2005/0105787 A1 | 5/2005 | Gulati | |
| 2005/0136509 A1 | 6/2005 | Gholap et al. | |
| 2005/0142579 A1 | 6/2005 | Sugiyama et al. | |
| 2005/0266395 A1 | 12/2005 | Gholap et al. | |
| 2006/0001765 A1 | 1/2006 | Suda | |
| 2006/0014238 A1 | 1/2006 | Gholap et al. | |
| 2006/0015262 A1 | 1/2006 | Gholap et al. | |
| 2006/0063190 A1 | 3/2006 | Fischer et al. | |
| 2006/0078926 A1 | 4/2006 | Marcelpoil et al. | |
| 2006/0127946 A1 | 6/2006 | Montagu et al. | |
| 2006/0160169 A1 | 7/2006 | Marcotte et al. | |
| 2006/0166253 A1 | 7/2006 | Kononen et al. | |
| 2006/0188140 A1 | 8/2006 | Gholap et al. | |
| 2006/0211017 A1 | 9/2006 | Chinnaiyan et al. | |
| 2006/0239533 A1 | 10/2006 | Tafas et al. | |
| 2006/0275844 A1 | 12/2006 | Linke et al. | |
| 2007/0114388 A1 | 5/2007 | Ogawa et al. | |
| 2007/0154958 A1 | 7/2007 | Hamann et al. | |
| 2007/0207489 A1 | 9/2007 | Pestano et al. | |
| 2008/0013816 A1 | 1/2008 | Rimm et al. | |
| 2008/0026415 A1 | 1/2008 | Rimm et al. | |
| 2008/0118437 A1 | 5/2008 | Pienta et al. | |
| 2008/0153098 A1 | 6/2008 | Rimm et al. | |
| 2008/0153877 A1 | 6/2008 | Adimoolam et al. | |
| 2009/0167850 A1 | 7/2009 | Bruno et al. | |

FOREIGN PATENT DOCUMENTS

| | | |
|---|---|---|
| EP | 0549905 | 4/1999 |
| EP | 0720114 | 1/2001 |
| EP | 1065496 | 3/2001 |
| EP | 1 202 563 | 5/2002 |

| | | |
|---|---|---|
| EP | 1251179 | 10/2002 |
| EP | 1300713 | 4/2003 |
| EP | 1329513 | 7/2003 |
| EP | 1 347 285 A1 | 9/2003 |
| EP | 1779088 | 2/2006 |
| EP | 1502098 | 9/2008 |
| GB | 2305723 | 4/1997 |
| GB | 2395263 | 5/2004 |
| GB | 2396406 | 6/2004 |
| GB | 2406908 | 4/2005 |
| GB | 2423150 | 8/2006 |
| GB | 2430026 | 3/2007 |
| JP | 2232550 | 9/1990 |
| JP | 4315119 | 11/1992 |
| JP | 5249102 | 9/1993 |
| JP | 7030753 | 1/1995 |
| JP | 11183381 | 7/1999 |
| JP | 2001211896 | 8/2001 |
| JP | 2003284713 | 10/2003 |
| JP | 2003294734 | 10/2003 |
| JP | 2004354346 | 12/2004 |
| JP | 2005-070537 | 3/2005 |
| JP | 2006194711 | 7/2006 |
| JP | 2007127485 | 5/2007 |
| JP | 2007232631 | 9/2007 |
| JP | 2007271484 | 10/2007 |
| JP | 2007278984 | 10/2007 |
| WO | WO 95/34050 | 12/1995 |
| WO | WO 96/09604 | 3/1996 |
| WO | WO 96/09605 | 3/1996 |
| WO | WO 96/23898 | 8/1996 |
| WO | WO 98/07022 | 2/1998 |
| WO | WO 99/30278 | 6/1999 |
| WO | WO-00/64147 | 10/2000 |
| WO | WO-00/79326 A1 | 12/2000 |
| WO | WO-02/056584 | 7/2002 |
| WO | WO 02/067188 | 8/2002 |
| WO | WO-02/086498 | 10/2002 |
| WO | WO 02/099429 | 12/2002 |
| WO | WO 03/008963 | 1/2003 |
| WO | WO 03/056343 | 7/2003 |
| WO | WO 03/093810 | 11/2003 |
| WO | WO-03/097850 A0 | 11/2003 |
| WO | WO 03/098522 | 11/2003 |
| WO | WO 2004/025569 | 3/2004 |
| WO | WO 2004/059288 | 7/2004 |
| WO | WO 2005/027015 | 3/2005 |
| WO | WO 2005/033706 | 4/2005 |
| WO | WO 2005/045734 | 5/2005 |
| WO | WO 2005/076197 | 8/2005 |
| WO | WO 2005/076216 | 8/2005 |
| WO | WO 2005/077263 | 8/2005 |
| WO | WO 2005/096225 | 10/2005 |
| WO | WO 2005/114578 | 12/2005 |
| WO | WO 2006/036726 | 4/2006 |
| WO | WO 2006/036788 | 4/2006 |
| WO | WO 2006/039396 | 4/2006 |
| WO | WO 2006/054991 | 5/2006 |
| WO | WO-2006/083969 A2 | 8/2006 |
| WO | WO 2006/102233 | 9/2006 |
| WO | WO 2006/105519 | 10/2006 |
| WO | WO 2006/122251 | 11/2006 |
| WO | WO 2007/024264 | 3/2007 |
| WO | WO 2007/133465 | 11/2007 |
| WO | WO 2008/012771 | 1/2008 |

OTHER PUBLICATIONS

A.K. Katoh et al., "Immunoperoxidase Staining for Estrogen and Progesterone Receptors in Archival Formalin Fixed, Paraffin Embedded Breast Carcinomas after Microwave Antigen Retrieval," Biotechnic & Histochemistry, vol. 72, No. 6, pp. 291-298, Nov. 1997.
Aaron J. Berger et al., "Automated Quantitative Analysis of HDM2 Expression in Malignant Melanoma Shows Associaion with Early-Stage Disease and Improved Outcome," Cancer Research, vol. 64, Dec. 2004, pp. 8767-8772.
Anthony McCabe et al., "Automated Quantitative Analysis (AQUA) of In Situ Protein Expression, Antibody Concentration, and Prognosis," Journal of the National Cancer Institute, vol. 97, No. 24, pp. 1808-1815, Dec. 21, 2005.
Chen, et al., "Ratio-Based Decisions and the Quantitative Analysis of cDNA Microarray Images," Journal of Biomedical Optics, SPIE, Bellingham, WA, vol. 2, No. 4, Oct. 1, 1997, pp. 364-374.
Communication mailed Apr. 28, 2010 in European Appln No. 08754418.5.
D.R.J. Snead et al., "Methodology of Immunohistological Detection of Oestrogen Receptor in Human Breast Carcinoma in Formalin-Fixed, Paraffin-Embedded Tissue: A Comparison with Frozen Section Methodology," Histopathology, vol. 23, pp. 233-238, 1993.
David J. Miller et al., "Emergent Unsupervised Clustering Paradigms with Potential Application to Bioinformatics," Frontiers in Bioscience, vol. 13, Jan. 2008, pp. 677-690.
David L. Rimm, MD PhD., et al., "Tissue Microarray: A New Technology for Amplification of Tissue Resources," The Cancer Journal, vol. 7, No. 1, Jan./Feb. 2001, pp. 24-31.
Duggan, et al., "Expression Profiling Using cDNA Microarrays," Nature Genetics, Nature Publishing Group, New York, vol. 21, No. Suppl., Jan. 1, 1999, pp. 10-14.
Feng, et al., "Adaptive Kurtosis Optimization Autofocus Algorithm," Journal of Electronics, vol. 23, No. 4, Jul. 2006, pp. 532-534.
Gina G. Chung et al., "Tissue Microarray Analysis of B-Catenin in Colorectal Cancer Shows Nuclear Phospho-B-catenin Is Associated with a Better Prognosis," Clinical Cancer Research, vol. 7, pp. 4013-2010, Dec. 2001.
Jacqueline F. MfGinty et al., "Double Immunostaining Reveals Distinctions Among Opioid Peptidergic Neurons in the Medical Basal Hypothalamus," Brain Research, vol. 278, pp. 145-153, 1983, Elsevier.
Kevin A. Roth et al., "Enzyme-based Antigen Localization and Quantitation in Cell and Tissue Samples (Midwestern Assay)," The Journal of Histochemistry & Cytochemistry, vol. 45(12), pp. 1629-1641, 1997.
Kononen, Juha et al., "Tissue Microarrays for High-Throughput Molecular Profiling of Tumor Specimens," Nature Medicine, vol. 4, No. 7, Jul. 1998, pp. 844-847.
M. Cregger et al., "Immunohistochemistry and Quantative Analysis of Protein Expression," Arch Pathol Lab Med, vol. 130, Jul. 2006, pp. 1026-1030.
Marisa Dolled-Filhart et al., "Classification of Breast Cancer Using Genetic Algorithms and Tissue Microarrays," Clin Cancer Research, vol. 12(21), pp. 6459-6468, Nov. 1, 2006, www.aacrjournals.org.
Marisa Dolled-Filhart et al., "Tissue Microarray Analysis of Signal Transducers and Activators of Transcription 3 (Stat3) and Phospho-Stat3 (Tyr705) in Node-negative Breast Cancer Shows Nuclear Localization Is Associated with a Better Prognosis," Clinical Cancer Research, vol. 9, Feb. 2003, pp. 594-600.
Molecular Devices, Corp., "GenePix Pro 6.0 Microarray Acquisition and Analysis Software for GenePix Microarray Scanners—User's Guide and Tutorial," Genepix Pro 6.0—Molecular Devices, Corp., Feb. 2005.
Notice of Allowance mailed Dec. 8, 2010 in U.S. Appl. No. 12/139,370.
Notice of Allowance mailed Feb. 18, 2011 in U.S. Appl. No. 12/201,753.
Office Action mailed May 12, 2010 in U.S. Appl. No. 12/139,370.
Office Action mailed Nov. 10, 2010 in U.S. Appl. No. 12/201,753.
Olli-P. Kallioniemi et al., "Tissue Microarray Technology for High-Throughput Molecular Profiling of Cancer," Human Molecular Genetics, vol. 10, No. 7, 2001, pp. 657-662.
Robert L. Camp et al., "Quantitative Analysis of Breast Cancer Tissue Microarrays Shows That Both High and Normal Levels of HER2 Expression are Associated with Poor Outcome," Cancer Research, vol. 63, Apr. 2003, pp. 1445-1448.
Robert L. Camp et al., "Automated Subcellular Localization and Quantification of Protein Expression in Tissue <icroarrays," New Technology—Nature Medicine, 2002, vol. 8, No. 11, pp. 1323-1327.
Search Report mailed Feb. 17, 2009 in International Appln No. PCT/US2008/006116.

Search Report mailed Jun. 12, 2009 in International Appln No. PCT/US200B/072235.
Search Report mailed Nov. 13, 2008 in International Appln No. PCT/US2008/074817.
Search Report mailed Nov. 18, 2008 in International Appln. No. PCT/US2008/09454.
Search Report mailed Nov. 24, 2008 in International Appln. No. PCT/US2008/007399.
Trevor Jowett, "Tissue In Situ Hybridization: Methods in Animal Development," John Wiley & Sons, Inc. and Spektrum Akademischer Verlag, 1997.

* cited by examiner

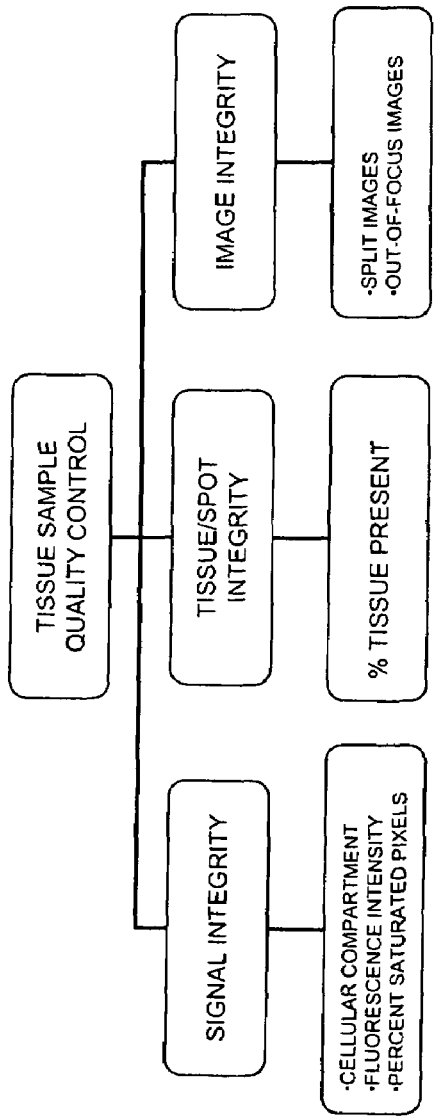
FIG. 4
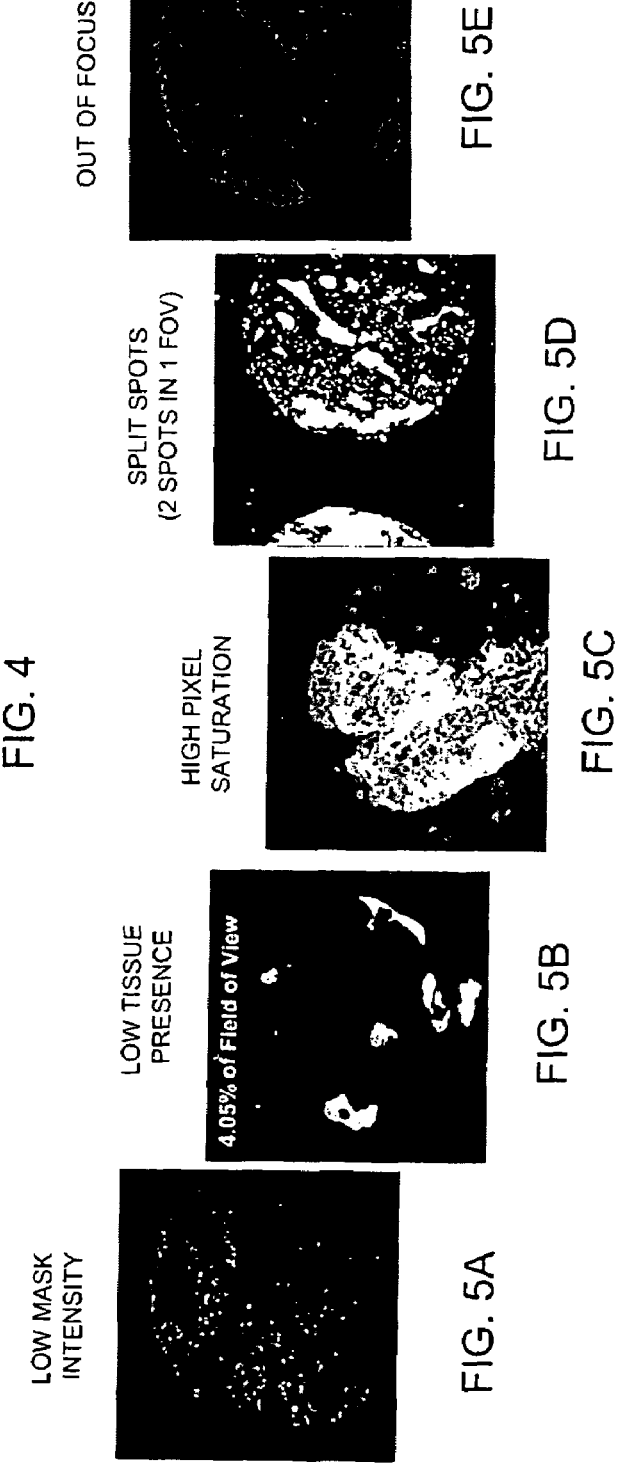
FIG. 5A
FIG. 5B
FIG. 5C
FIG. 5D
FIG. 5E

FIG. 19B

METHODS AND SYSTEM FOR VALIDATING SAMPLE IMAGES FOR QUANTITATIVE IMMUNOASSAYS

CROSS-REFERENCE TO RELATED APPLICATION

This application claims the benefit of U.S. Provisional Application No. 60/954,303, filed Aug. 6, 2007, which is incorporated by reference in its entirety.

BACKGROUND

Tissue microarray (TMA) technology was first described by Wan and Furmanski (Wan et al., 1987), and later advanced by Kononen and Kallioniemi in 1997 with production of an apparatus for mass-production of TMAs (Kononen et al., 1998). Consisting of an ordered array of tissue cores—up to 2,000—on a single glass slide, tissue microarrays provide a mechanism for a maximal use of scarce tissue resources. Most tissue microarrays are currently constructed from pathology tissue block archives, and the coordinate clinical data can be correlated with experiments performed on these tissues. TMAs allow for the validation of new concepts in cell and molecular biology on human tissue (Rimm et al., 2001a; Rimm et al., 2001b) and have been considered the ultimate step in the association of gene expression information with human tissues and human disease.

With over 30,000 genes within the human genome, encoding over 100,000 proteins, the task of sorting the vast number of gene and protein targets to identify those with clinical relevance and diagnostic, prognostic, and/or therapeutic potential which are thereby promising pharmaceutical targets is overwhelming. Target validation is an important step and has traditionally been done with assays such as Northern blot analysis, RT-PCR, macroarray, microarray, and gene chips. These technologies simply provide evidence of differential expression of specific genes. For most techniques in molecular biology, tissue is homogenized to isolate RNA or protein for expression analysis. Unfortunately, the tissue obtained is not necessarily composed solely of the cells of interest. The tissue homogenate can contain normal cells, tumor cells, blood cells, muscle cells, and other cell types that may result in misleading information. Additionally important spatial information that is the context of expression within cells and tissues is lost when using these techniques.

Tissue microarrays supply a mechanism for conservation of tissue, while providing the ability to evaluate hundreds of archival tissue specimens on a single microscope slide. By exposing all tissues of a tissue microarray to precisely the same conditions, the slide-to-slide variability inherent to immunohistochemistry and in situ hybridization is minimized.

In an exemplary process, the target tissues are core-biopsied with a 0.6-1.5 mm diameter needle under the guidance of a pathologist. The cores are then arranged in a 'recipient' paraffin block. The maximum number of specimens one block can hold varies with core size. For example, up to 60 cores are possible with 1.5 mm needles and up to 2000 or more with new smaller diameter needles. The most common size is about 0.6 mm allowing a maximum of about 750 tissue core section, commonly referred to as histospots. The block containing the array is sectioned in an identical fashion to any paraffin-embedded tissue block. The maximum number of sections a block can provide depends on the size of the original tumor and the skill of the histotechnologist, but it is not uncommon to obtain hundreds of sections from a single conventional specimen (Rimm et al., 2001a; Rimm et al., 2001b).

Unlike traditional tissue analysis techniques, which use at least one slide for every tissue from each patient or test subject, TMA technology offers the benefits of: (1) conservation of precious tissue resources, (2) improved internal experimental control, (3) reduced consumption of reagents, and (4) facilitation of multi-center research studies.

TMA studies and those done using whole tissue sections (WTS) frequently employ sophisticated methods for scanning the processed tissues as well as archiving and analyzing the resulting visual data. However, the majority of scientists still analyze tissue specimens in a traditional fashion using microscopes. Manual inspection on a microscope to interpret staining results involves multiple manual steps, lacks standardization, and is slow. A few devices have been developed in recent years to allow for quantitative, efficient, and specific analysis of data generated from TMAs and WTS. However quality assessment of each tissue specimen is still done by a pathologist or trained scientist to confirm for example that tissue samples are present and not artifactually damaged and that staining is even and reproducible across the slide. Typically after staining, a specimen is reviewed by a pathologist or technician viewing each individual histospot or a whole tissue sample across multiple fields of view (FOV) in a traditional fashion using microscopes. The pathologist or technician provides a subjective assessment of the quality of the particular spot, FOV or WTS and whether it should be included or excluded from further analysis. For example, manual validation of a multi-spot TMA that contains for example 700 or more spots can easily take eight hours of a professional's time. Even amongst trained professionals, manual validation is not consistent due to the subjective nature of the evaluation. Better methods for assessing quality of histological tissue sections, including TMA specimens prior to analytical analysis are clearly needed.

SUMMARY OF THE INVENTION

Using an exemplary method of the present invention, automated validation of a TMA containing 700 histospots may be essentially instantaneous and the professional may spend approximately 20-30 minutes reviewing only those samples identified by the method as of poor quality in terms, such as the criteria outlined here (e.g., in a particular embodiment, for split spots). Similarly, when evaluating whole tissue sections (WTS), several fields of view (FOV) are evaluated. The methods of the present invention are used to automatically validate such fields of view. The present method reduces the impact of reviewer subjectivity. The present invention also provides for record keeping and traceability of the validation process and results.

In one aspect, the invention relates to a method for automatically evaluating quality of a slide-mounted tissue sample. In general, sample quality can be affected by one or more qualities of the biological sample itself, as well as by the quality of an image obtained therefrom. The quality can be ascertained from one or more quantitative quality indicators. A digital image is received of a magnified portion of the slide-mounted tissue sample. At least one quantitative quality indicator is automatically determined of at least one of the slide-mounted tissue sample, and the digital image of the magnified portion of the slide-mounted tissue sample. It is automatically determined whether the at least one quantitative quality indicator meets a respective minimum acceptable quality threshold. Failure of the at least one quantitative quality indicator to meet its respective minimum acceptable quality threshold is indicative of at least one of the slide-mounted tissue sample and the digital image of the magnified portion of the slide-mounted tissue sample being considered unsuitable for automated pathological evaluation.

In another aspect, the invention relates to a system for automatically evaluating quality of a slide-mounted tissue sample. The system includes a microscope configured to magnify at least a portion of the slide-mounted tissue sample. An image sensor, such as a CCD camera is in optical communication with the microscope. The image sensor obtains a digitized image of the magnified portion of the slide-mounted tissue sample. The system also includes a processor module in communication with the image sensor. The processor module is configured to automatically determine at least one quantitative quality indicator of at least one of the slide-mounted tissue sample, and the digital image of the magnified portion of the slide-mounted tissue sample. The processor module automatically determines whether the at least one quantitative quality indicator meets a respective minimum acceptable quality threshold. Failure of the at least one quantitative quality indicator to meet its respective minimum acceptable quality threshold is indicative of at least one of the slide-mounted tissue sample and the digital image of the magnified portion of the slide-mounted tissue sample being considered unsuitable for automated pathological evaluation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is another flow diagram of one embodiment of an imaged tissue sample quality control process.

FIG. 5A is an exemplary imaged tissue sample exhibiting low signal intensity within a masked area.

FIG. 5B is an exemplary imaged tissue sample exhibiting low tissue of interest presence.

FIG. 5C is an exemplary imaged tissue sample exhibiting high pixel saturation.

FIG. 5D is an exemplary imaged tissue sample exhibiting a split-spot misalignment.

FIG. 5E is an exemplary imaged tissue sample exhibiting an out-of-focus image.

FIG. 19A and FIG. 19B are an exemplary "screen shots" of a graphical user interface of a program for validating quality of a slide-mounted biological specimen according to principles of an embodiment of the present invention.

DETAILED DESCRIPTION OF THE PREFERRED EMBODIMENTS

A computer assisted method for automated review of individual acquired images of slide-mounted biological specimens evaluates one or more different criteria to ensure minimum thresholds of quality are met for automated pathological evaluation and particularly for quantitative automated pathological evaluation. A particular study may include more than one specimen, for example in a tissue microarray format. The method of the invention utilizes an acquired image of each histospot and determines if minimum thresholds of quality are met to include each histospot in the set for subsequent data analysis. A study may be of a whole tissue specimen for which images of multiple fields of view (FOV) are individually acquired and the method of the invention automatically reviews acquired images to ensure quality suitable for analysis. In particular, the different criteria are analyzed quantitatively.

The slide-mounted biological specimens may include one or more individual slide-mounted tissue sections and/or slide-mounted tissue microarrays. In general, the criteria used to automatically determine whether the specimen should be included in sets for subsequent data analysis include one or more quantitative quality indicators. Such quantitative quality indicators can be identified for such quality indications as (i) assessing staining quality, (ii) evaluating tissue sample integrity, and (iii) evaluating image integrity.

Figure 2:
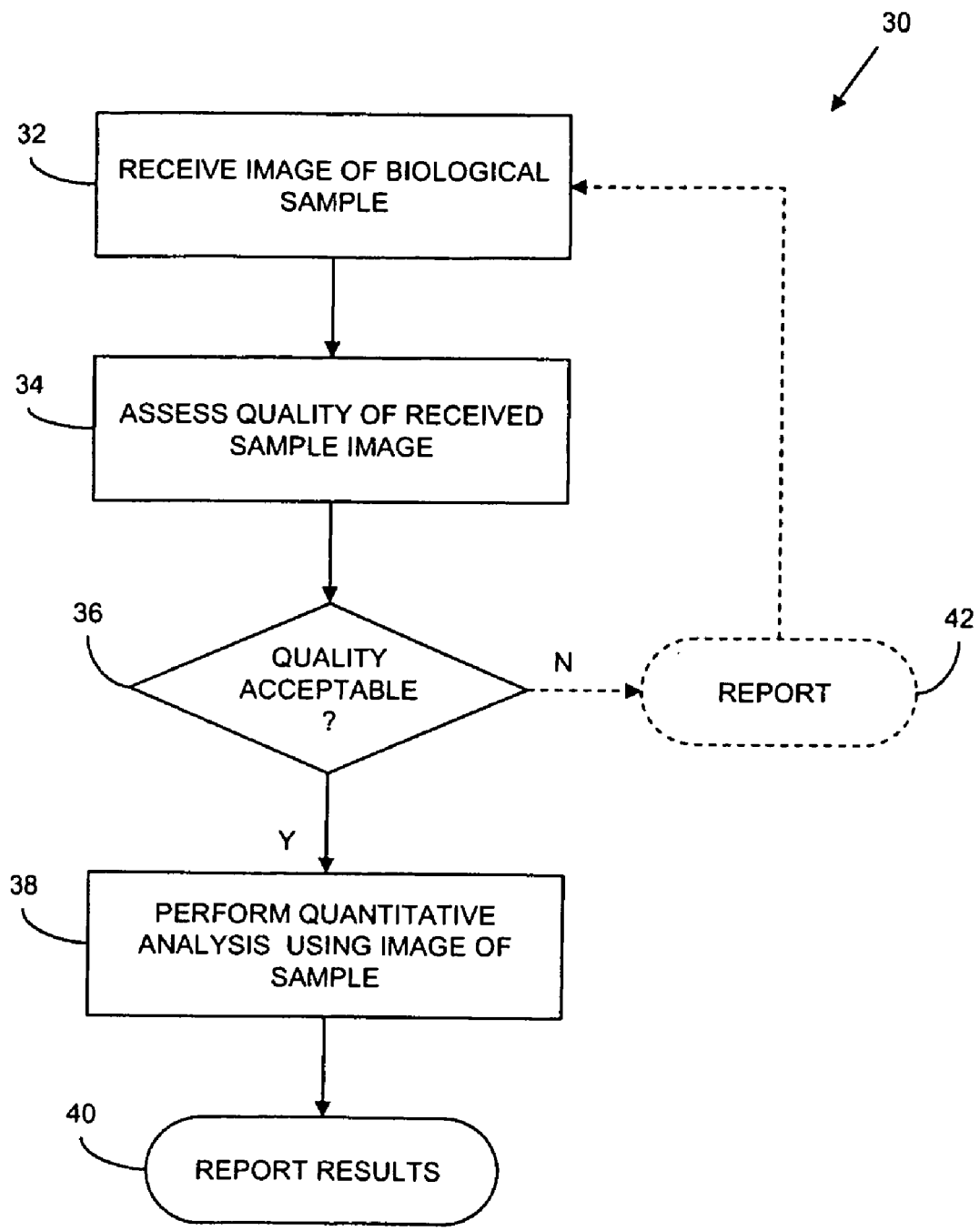
FIG. 2 is a flow diagram of an exemplary process according to an embodiment of the present invention.

A flow diagram of one embodiment of an automated validation process 30 for identifying samples failing to meet minimum set criteria is illustrated in FIG. 2. In a first step 32 of an automated validation process 30, an image is received of a biological sample that has been the subject of an immunoassay. The image can be an electronic image, such as a pixellized image from an electronic image sensor, such as a charge-coupled device (CCD) camera. At step 34, a quantitative assessment is made as to a quality indicator of the received sample image. Quality may be affected by one or more criteria of the underlying biological specimen itself and an image taken thereof. At step 36, a determination is made as to whether the quality indicator of the received image and/or biological specimen meets an acceptable quality threshold.

In general, the received image can be processed by an image processor according to one or more quantitative quality indicators. The image processor compares the quantitative quality indicators determined from analysis results of the received image to one or more respective quantitative quality threshold values. If the comparison is favorable, the image is determined to be useable or otherwise validated for further quantitative analysis at step 38 (or quantitative analysis of immunoassay results). Results of validation process may be reported to a user at step 40. If the comparison is unfavorable, the image is determined to be unusable for further quantitative analysis and such results are reported at step 40. In some embodiments, the determination is that a tissue sample failing to meet any of the quantitative quality indicators be identified for further analysis. Such further analysis may include a manual inspection to conclude an ultimate determination as to validity of the specimen. The automated validation process 30 can be repeated for multiple fields of view of a whole tissue section or multiple spots of a TMA prior to performing any quantitative analysis.

In some embodiments, the quantitative analysis of immunoassay results is performed for all tissue samples. The results of the automated validation process can be used to later identify which results to retain and which to discard.

With respect to particular quality issues, the staining of a slide-mounted biological specimen may be too faint or too bright for optimal analysis, as a result of the actual staining, aspects of the staining protocol, reagents used and concentrations of reagents used. Particularly for quantitative fluorescent analysis, staining intensity that is below a minimum acceptable level or above a maximum acceptable level will affect image quality the dynamic range of image data and therefore data quality.

Throughout the application, when referring to "intensity" in the context of a pixel intensity in an acquired image of a stained tissue section, it is generally intended to mean intensity normalized for exposure time, in other words "power."

Staining quality can be assessed for one or more different staining criteria. A first staining criterion is stain uniformity used as an indicator as to whether staining across the slide mounted whole tissue section or tissue microarray is consistent. Ideally, the entire tissue section, or array of histospots is treated uniformly within an acceptable tolerance during immunostaining. Entire sample slides, or portions thereof can be identified as lacking such uniformity resulting in inadequate staining characteristics and are therefore excluded from subsequent data analysis.

Another staining criterion is stain intensity, used as an indicator as to whether the intensity level of staining is acceptable. A stain intensity of at least one portion of the entire tissue section or array of histospots is obtained and scrutinized to determine whether the particular intensity falls within an acceptable range. The range can be a minimum acceptable range. Alternatively or in addition, the range can be a maximum acceptable range. Such a determination can be made for each spot of a tissue microarray or each field of view of a whole tissue section. Entire sample slides, or portions thereof can be identified as lacking sufficient stain intensity and therefore excluded from subsequent data analysis.

Yet another staining criterion is stain quality, used as an indicator as to whether the quality of staining, or quality of the tissue sample is acceptable. A stain known to be specific for a particular discrete feature of the sample, for example a specific sub-cellular compartment (i.e., nucleus) can be used to evaluate staining quality. A ratio of the stain intensity within the targeted sub-cellular compartment to stain intensity outside of the compartment, in a different compartment, or to the entire sample can be formulated and used to determine whether the particular stain quality falls within an acceptable range.

In some embodiments, the staining quality assessment is repeated for each stain of a multiplexed assay. Depending upon the nature of the analysis, the sample slides or portions thereof can be identified as lacking stain uniformity, stain intensity quality and/or stain quality and therefore excluded from subsequent data analysis according to results of any one of the stains individually, one or more of the stains in particular, or all of the stains. For example, it may be acceptable to proceed with analysis when a first stain targeting nuclei demonstrates an acceptable stain level, but a second stain targeting cytoplasm demonstrates an unacceptable stain level. A histospot or portion of a whole tissue section failing such a quality assessment can be identified as lacking sufficient quality for further automated analysis. Thus, the particular quality thresholds can be chosen according to intended automated analysis.

Tissue sample, or spot integrity can be assessed for one or more different sample criteria. A first sample criterion is tissue sufficiency, used as an indicator as to whether sufficient target tissue of interest (for example tumor tissue) is present in the tissue specimen or spot, or in the image (field of view) of the tissue specimen or spot. Tissue specimens or spots sometimes do not contain tissue of interest, for example if the tissue of interest is an epithelial cancer tissue, the tissue sample may be all stroma, fatty tissue and not contain tumor epithelial cells, and therefore there is no relevant tissue in the particular sample.

Another sample criterion is sample statistics used to determine whether the sample exhibits an unexpected distribution. For example a certain unit area may be expected, such as for nuclei in a tissue sample, and specimens for validation can be reviewed in terms of this criteria and flagged when results fall outside an expected distribution.

An acquired image sample criterion is signal intensity. Signal intensity can be a quality indicator used to determine whether a signal saturation value is below or above an acceptable threshold. The staining of a slide-mounted biological specimen may be too faint or too bright resulting in images that are sub-optimal for analysis. This may be a result of the actual staining and resulting stain intensity or as a result of imaging and resulting pixel intensity. Particularly for quantitative fluorescent analysis, staining intensity and acquired pixel intensities that are below or above optimal range will affect data quality. Tissue autofluorescence, particularly in certain channels can result in measurement of signal that is not related to the target/biomarker or a compartment stain the operator intends to measure. Debris in the field of view may also fluoresce intensely resulting in saturating pixels within acquired images, rendering them unacceptable for further analysis.

The acquired image integrity of a tissue specimen can also be assessed for one or more different criteria of quality. A first image criterion is tissue sample position, used as an indicator as to whether the acquired image captured sufficient and appropriate portions of the field of view of a whole tissue section or TMA histospot. For example, specimens prepared on microscope slides are not always aligned optimally such that an image acquisition procedure may result in an acquired image being of an intended area i.e., thought to be a tissue spot and the resulting image may have (i) no tissue, (ii) a portion of the tissue spot, or (iii) a portion of more than one spot or "split image." Another image criterion is image focus, used as an indicator as to whether the acquired image is in-focus or out-of-focus.

As with the staining criteria, one or more of the different tissue sample quality criteria and image quality criteria assessments can be repeated for each stain of a multiplexed assay. Depending upon the nature of the analysis, the sample slides or portions thereof or respective acquired images can be identified as lacking the respective criterion and therefore excluded from subsequent data analysis according to results of any one of the stains individually, one or more of the stains in particular, or all of the stains.

Figure 3:
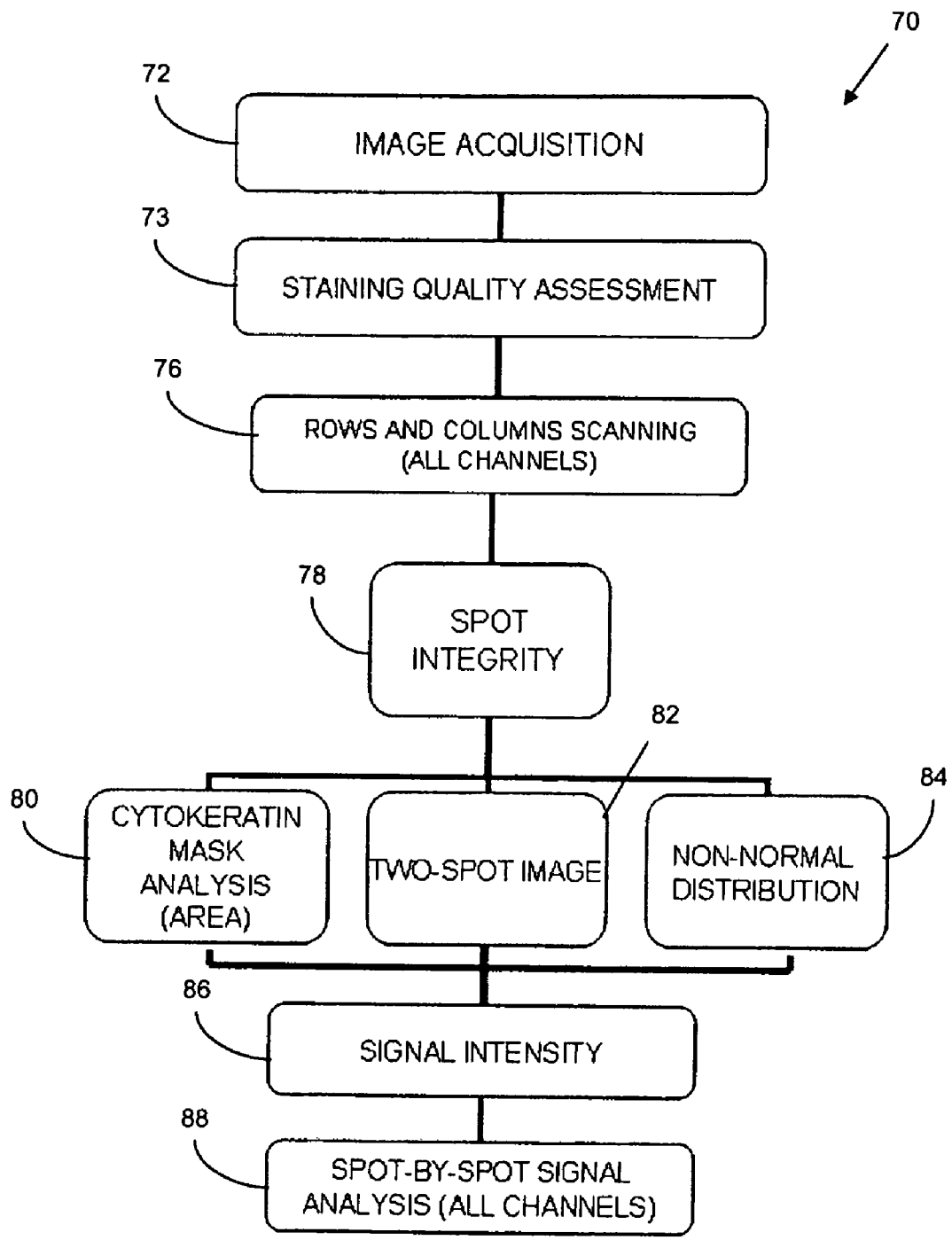
FIG. 3 is a more detailed flow diagram of an exemplary process according to an embodiment of the present invention.

A more detailed flow diagram of one embodiment of one embodiment of an automated validation process 70 is shown in FIG. 3. In a first step 72, image acquisition yields an electronic image of a slide-mounted biological sample. At step 73, a staining quality assessment of the acquired image, or at least a portion thereof is performed. At step 76, the staining quality assessment can be accomplished for all rows and columns of for example a TMA sample and for all channels of a multiplexed assay. At step 78, the integrity of the sample region or spot is determined. Spot integrity can be determined by one or more criteria including presence of sufficient tissue of interest (i.e., detection of tumor tissue area identified as a cytokeratin mask) at step 80, appropriate acquisition of field of view, (i.e., identifying split-spot fields of view) at step 82, and quality of image of the tissue specimen (i.e., identifying non-normal distributions of pixel intensities) at step 84. Signal intensity is evaluated at step 86 including image by image, spot-by-spot signal analysis. This analysis can be performed for all channels of a multi-channel application (step 88).

In still more detail, referring now to FIG. 4, the automated validation process includes a tissue sample quality control module for determining quantitatively that a tissue sample and staining meets an established quality threshold for further automated quantitative immunoassay. In some embodiments, the quality control module includes at least one of a staining check or signal integrity module, a sample check or tissue/spot integrity module and an acquired image check or image integrity module. The signal integrity module can investigate aspects of one or more of stain variations among different sub-cellular compartments, staining (i.e., fluorescent) intensity, and percent saturated pixels. The tissue/spot integrity module can determine a percent of tissue present within a given sample, whereas, the image integrity module can identify image defects such as split images and out-of-focus images.

FIG. 5A illustrates an exemplary imaged tissue sample exhibiting low signal intensity within a tissue mask area. The signal integrity module of the automated validation process is configured to identify through automated quantitative analysis that such an image fails to meet a related quality threshold.

FIG. 5B illustrates an exemplary imaged tissue sample exhibiting low percentage of tissue of interest is present. The tissue/spot integrity module of the automated validation process is configured to identify through automated quantitative analysis that such an image fails to meet a related quality threshold.

FIG. 5C illustrates an exemplary imaged tissue sample exhibiting high pixel saturation. The signal integrity module of the automated validation process is also configured to identify through automated quantitative analysis that such an image fails to meet a related quality threshold.

FIG. 5D illustrates an exemplary imaged tissue sample exhibiting a split-spot image misalignment. The image integrity module of the automated validation process is configured to identify through automated quantitative analysis that such an image fails to meet a related quality threshold.

FIG. 5E illustrates an exemplary imaged tissue sample exhibiting an out-of-focus image. The image integrity module of the automated validation process is also configured to identify through automated quantitative analysis that such an image fails to meet a related quality threshold.

Figure 1:
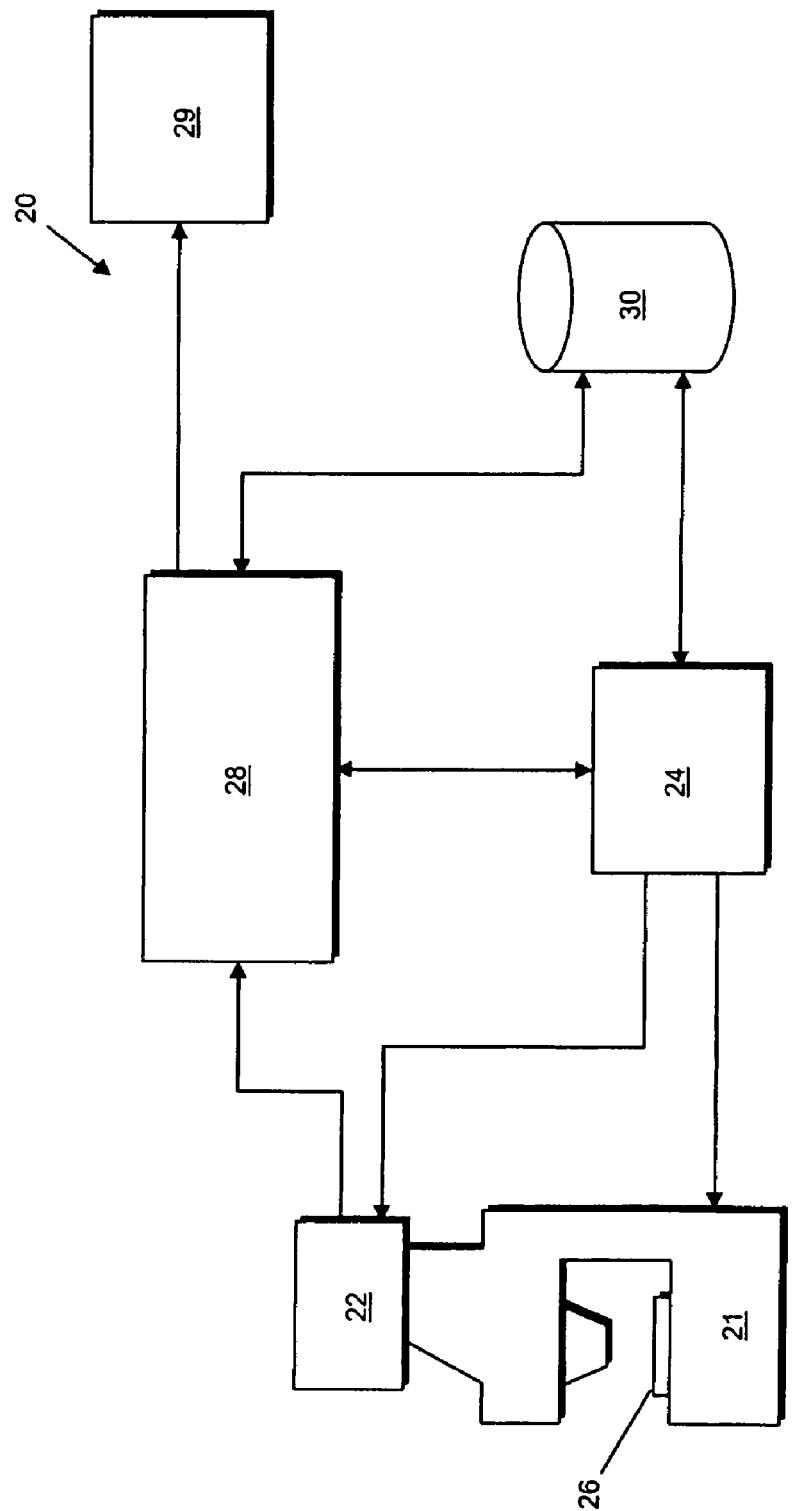
FIG. 1 is a block diagram of one embodiment of an apparatus for automated analysis of tissue samples embodying an example of the present invention.

A system for automated analysis of biological specimens is generally indicated by reference numeral 20 as shown in block diagram form in FIG. 1. The system 20 includes a microscope subsystem 21 configured to obtain a magnified image of a biological specimen 26. The microscope subsystem 21 includes an image capture device, such as a CCD camera 22 for acquiring images of the biological specimen 26 as observed through the microscope subsystem 21. The microscope subsystem 21 may include viewing oculars (not shown) for operator viewing. In some embodiments, the microscope subsystem 21 is remotely controllable by a microscope controller 24 for controlling one or more of a number of microscope subsystem functions. For example, the microscope controller 24 can control an X-Y positioning stage for automatic positioning and repositioning of the biological specimen 26, operation of an illumination light source to illuminate at least a portion of the biological specimen 26, selection of an objective for viewing the biological specimen 26 with a preferred magnification, operation of a Z-stage positioner for focusing of the magnified image, and operation of the CCD camera 22 for acquiring an electronic image of a magnified portion of the biological specimen 26.

The system 20 also includes an image processor 28 adapted for processing received electronic images of magnified portions of the biological specimen 26. In some embodiments, the image processor 28 may be coupled to the microscope subsystem 21 as shown, automatically receiving images directly from the CCD camera 22. In other embodiments, the image processor 28 can be separate from the microscope subsystem 21, receiving pre-stored copies of electronic images obtained from the CCD camera 22, real-time, or near real-time through streaming media. In some embodiments, the image processor 28 is in communication with the microscope controller 24. In some embodiments, the image processor is included together with the microscope controller 24 in a common computer system. One or more of images obtained from the CCD camera 22 and imaging processing results obtained by the image processor 28 can be stored in a file storage system, such as a database 30. Such storage can be local or remote.

In automated quantitative pathology applications, one or more of images and image-processed results obtained by the system 20 can be provided to an automated immunoassay evaluation system 29. Such systems can be used to quantitate protein expression within sub-cellular compartments in tissue sections automatically, with a high level of precision. Quantitative measure of a biomarker can be determined by the method of U.S. Pat. No. 7,219,016, the entire contents of which are incorporated herein by reference. At least one exemplary system for performing such a quantitative measure is the AQUA® system, the PM-2000™ system—a multi-tissue proteomic analysis platform combining fluorescencebased image analysis with automated microscopy, which is commercially available from HistoRx Corp. of New Haven, Conn. In some embodiments, the image processor 28 is included together with the immunoassay evaluation processor 29 in a common computer system. For examples, the image processor 26 and the immunoassay evaluation processor 29 can be separate programs running on a common computer system, or even different software code modules within a common program.

The system 20 can be used for automatically scanning prepared microscope slides for the detection and measurement of staining in tissue of interest. A number of stains are used to preferentially stain candidate tissues, cells and sub-cellular compartments, an/or biomarkers of interest and different colors so that they can be distinguished from each other.

As noted in the background of the invention, a biological specimen may be prepared with a reagent or series of reagents resulting in a detectable end product such as a fluorescent signal or a colored insoluble precipitate. The apparatus of the present invention is used to detect the assay end product corresponding to the tissues, cells and sub-cellular compartments, an/or biomarkers object of interest.

During operation of the system 20, an operator inserts a biological specimen 26 prepared as a slide into the microscope subsystem 21. Each prepared slide 26 can include a whole tissue section or an array of samples, such as those prepared as tissue microarrays or as an individual tissue section. Each slide can be scanned at a low microscope magnification, for example, ten-times magnification, to capture an image of at least a region of the slide. This process can be repeated at other slide coordinates to capture different regions of the same slide. In some embodiments, electronic images of these regions can be related to each other to form an electronic image of the slide 26.

After the low magnification scanning is completed, the system 20 can be used to reexamine smaller regions of individual tissue samples or histospots. For example, a sample spot of the slide 26 is suitably positioned, focused, and imaged at a higher magnification (for example 40×) to obtain additional magnified images for further processing, such as automated quantitative immunoassay processing. In some embodiments, the images may be acquired by the image analysis program (i.e., AQUA® analysis) and imported into a validation program for quality control review, or validation program may be integral to the analysis program. Alternatively, image acquisition can be followed by the validation program then samples that pass are analyzed in the analysis program (i.e., AQUA analysis).

Stain Uniformity Assessment

Figure 7:
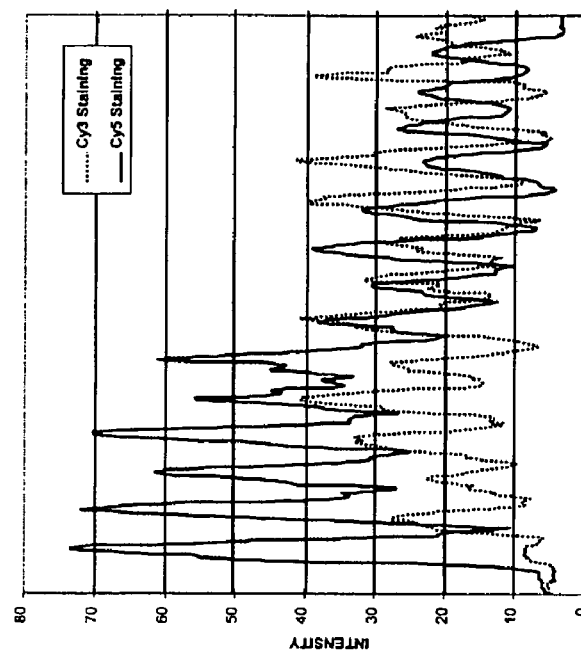
FIG. 7 is a graph illustrating the sums of pixel intensities per column of pixels of the digital images of FIG. 6A and FIG. 6B.
Figure 6A:
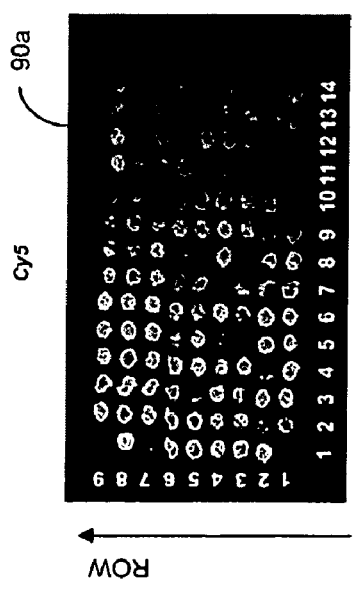
FIG. 6A is a Cy5 channel image of a stained slide-mounted TMA specimen illustrating unacceptable staining uniformity.

Having described the overall operation of the system 20 from a high level, the further details of the embodiment of the image processor 28 will now be described. Referring to FIG. 6A, an image 90a is shown of a biological specimen TMA stained in a multiplexed assay using immunohistochemical (IHC) methods including for example a Cy5 detection reagent. The image 90a can be a digital image comprising a plurality of pixels, of a low-magnification view of a sample, in this instance a TMA having 9 rows and 14 columns, obtained by the CCD camera 22 (FIG. 1). In order to determine stain uniformity across the slide or at least the imaged portion of the slide, the intensity values of vertical columns of pixels are combined along the respective column and plotted across the x-axis. The combination can be a straightforward addition of pixel intensity values along the column. Alternatively or in addition, the combination can be a statistically arrived at value, such as an average intensity value of all of the pixels in the column. For example, with an image using 8 bits to represent intensity, there are 256 possible pixel intensity values for each pixel. The pixel intensity values span a range from black (e.g., "0") to white (e.g., "255"). Values in between black and white are associated with varying shades of gray. Results of the combination of pixel intensity values within each column along the image are graphically represented in FIG. 7. The solid curve is indicative of the sum of acquired Cy5 channel pixel intensities for vertical columns of the image in FIG. 6A and reflects an oscillating pattern having multiple peaks substantially uniformly distributed across the graph. Each peak is indicative of a combination of the pixel intensity values of a respective column of samples in the sample image of FIG. 6A. Valleys between the peaks are indicative of dark space between the sample columns. By the graph, it is easily observable that the relative peak values for columns along a left half of the slide are substantially greater than the relative peaks for columns along the right half of the slide. In particular, the relative peaks for columns of samples on the left hand side of the fall between 50 and 75, whereas the relative peaks for columns of samples on the right hand side of the slide fall between 20 and 40. The maximum variation in column intensity between the maximum and minimum relative peaks is about 50.

In some embodiments, the graphical results are interpreted automatically by the image processor 28 (FIG. 1). For example, the relative maxima can be identified and the relative peak values stored according to their horizontal position (i.e., column). Variations between maxima can be calculated as differences, with low difference values being indicative of stain uniformity. Alternatively or in addition, the combined intensity curve of FIG. 7 can be further processed to yield a trend line. For example, the curve can be processed according to a moving average digital filter to smoothen the curve. In the illustrative example, a trend line would be a negatively sloped line. For variations above a threshold value, or a trend-line slope above a threshold slope value, the slide or portions thereof can be identified as unacceptable for automated analysis.

Figure 6B:
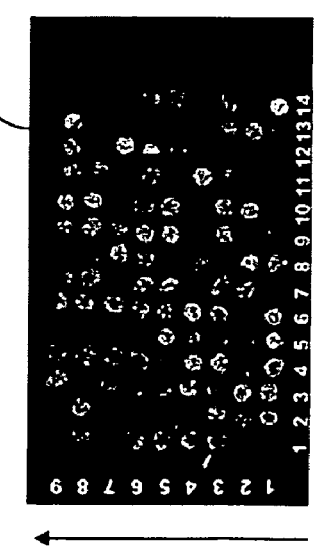
FIG. 6B is a Cy3 channel image of the same stained slide-mounted TMA specimen shown in FIG. 6A.

For stain uniformity assessment, it is important to evaluate a stain for a marker that is expected to be relatively uniformly expressed in samples or fields of view across the slide or a positional bias in staining across the slide may not be evident. For example, FIG. 6B illustrates an image 90b of the same biological specimen slide imaged in FIG. 6A, but of a different stain, in this case acquired using the Cy3 channel. As described above in relation to FIG. 6A, pixel intensity values can be combined (e.g., summed) in each of the sample columns to produce the dashed curve in FIG. 7. The resulting dashed curve also includes an oscillating pattern having multiple peaks substantially uniformly distributed across the graph. The relative Cy3 intensity peaks 90b fall within a range of between about 20 and 40, with a maximum variation of less than 20. However, depending upon a threshold value, the Cy3 results of the image 90b can be interpreted as a suitably uniform stain. Therefore, particularly in a multiplexed assay, staining positional bias is assessed for any stain that is known to be uniformly expressed across the tissue samples, or fields of view. If it is unknown which stain should be expected to be uniformly expressed across the sample, then each stain is individually assessed. If one or more of the stains shows a trend indicating a staining bias, the slide is rejected from further quantitative analysis, or at least flagged for manual review.

In some embodiments, the uniformity of staining of a biological specimen slide is also assessed across horizontal columns. Horizontal assessment can be performed in place of or in addition to the vertical column process described above. The pixel intensity values of the horizontal column is combined (summed or averaged) and plotted similarly to FIG. 7. The data and/or plots are inspected for trends indicative of any positional bias in stain intensity.

Figure 8B:
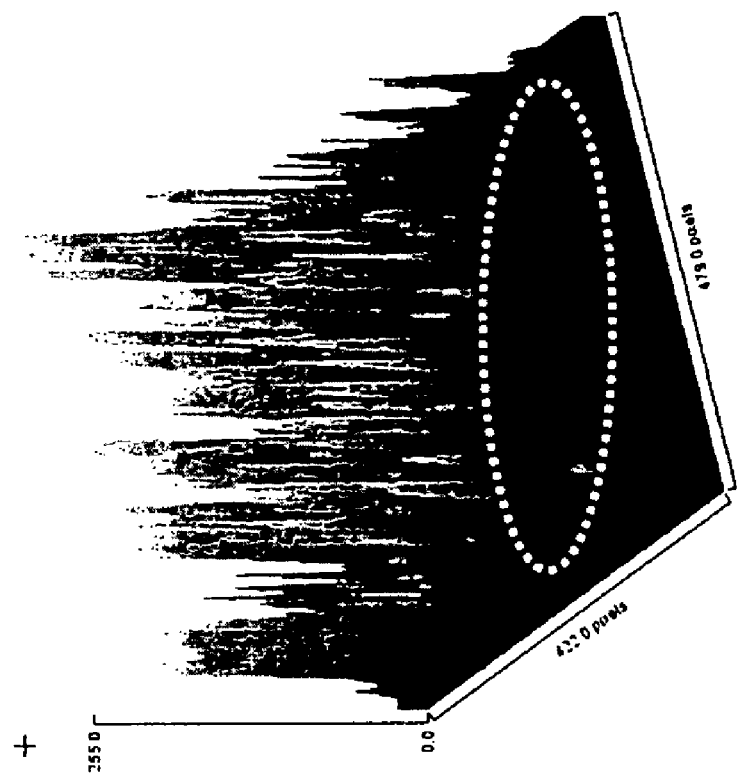
FIG. 8B is a three-dimensional graph illustrating pixel intensities across the digital image of FIG. 8A having unacceptable stain uniformity.
Figure 8A:
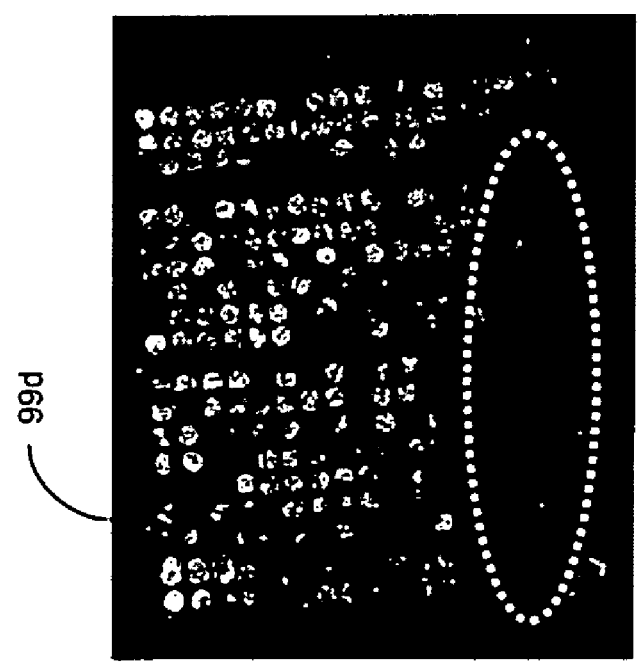
FIG. 8A is an image of another slide-mounted TMA specimen illustrating unacceptable staining uniformity.

Alternatively or in addition, pixel intensities can be plotted in a three-dimensional format, with the resulting sample field being inspected for any indication of positional bias in staining. The x-y scale refers to a position of a particular region of the specimen, such as a location or a particular histospot for a TMA or for a particular FOV for a whole tissue section. FIG. 8A shows an example of staining with an indication of positional bias that would adversely affect any subsequent analytical analysis of this cohort of specimens. FIG. 8B shows a three-dimensional stain intensity plot of the staining shown in FIG. 8A, including a dashed ellipse loosely drawn about a region of reduced stain intensity indicating a positional staining bias that would adversely affect subsequent analysis. This assessment can be done for one or more of the stains in a multi-stain sample. Ideally, it is used to assess at least one stain that is expected to be uniformly represented in samples under investigation.

Stain Quality Assessment

Figure 9B:
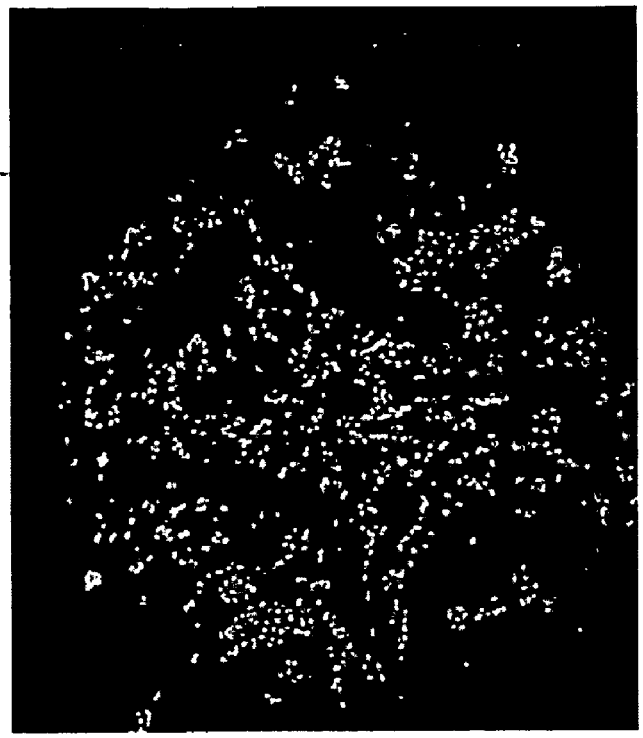
FIG. 9A and FIG. 9B are exemplary fields of view respectively illustrating an image of a first sample spot having an unacceptable staining quality ratio and a second sample spot having an acceptable staining quality ratio.
Figure 9A:
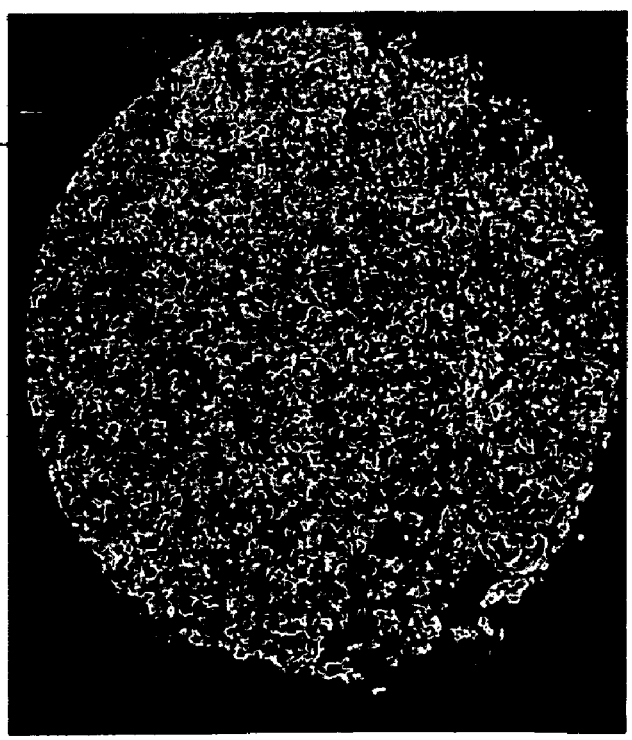

An image of a biological specimen prepared as a microscope slide stained with a reagent known to be specific for a particular discrete feature or area, such as a specific sub-cellular compartment of the sample is shown in FIG. 9A and FIG. 9B. In this instance, staining quality was assessed for a stain specific for cell nuclei. In general, the image analysis program (integral to the validation program or external with data imported into the validation program) measures the staining intensity of the compartment specific stain inside the compartment (for example, in pixels of the digital image that are identified as part of the compartment). In this instance, image pixels associated with nuclei are identified and stain intensity of such nuclei is measured through pixel intensity. Total stain intensity within the nuclear sub-cellular compartment may be formulated as a combination, such as a sum of the intensities of pixels identified as representing nuclei. Total stain intensity outside of the nuclear sub-cellular compartment can be similarly formulated as a sum of the intensities of pixels identified as not nuclear. The two values for nuclei and non-nuclear are compared. For example, the two values can be combined in a ratio, the single value of the ratio indicative of the comparison. For example, the combined nuclei intensity can be divided by the combined non-nuclear intensity by the image processing program to provide a tissue stain quality ratio. A low ratio, such as a ratio approaching 1, is indicative of poor staining quality or poor tissue integrity. An acceptable minimum staining quality threshold can be fixed or settable by a user. Such samples identified as failing to meet the minimum staining threshold can be excluded from the data set and from further analysis by the validation program.

For example, 4',6-diamidino-2-phenylindole (DAPI) is a fluorescent stain that specifically stains cell nuclei. A tissue stain quality ratio (DAPI staining intensity in the nuclei over DAPI staining intensity in the cytoplasm) for example in some instances indicate poor staining quality. For example a ratio between 1-3 may be used to indicate a poor staining quality. In some embodiments a ratio of less than about 1.5 indicates poor staining quality. Stain quality analysis of the first sample of FIG. 9A yielded a ratio of about 1.2. In the present example, being less than a stain quality threshold value of 1.5 identifies the sample as having a poor staining quality or poor tissue integrity. The particular minimum tissue staining quality ratio may depend upon the particular staining technique employed. Stain quality analysis of the second sample of FIG. 9B yielded a ratio of about 5.9. Being substantially greater than the stain quality threshold value of 1.5 identifies the sample as having an acceptable staining quality and tissue integrity.

Tissue Sufficiency

An image analysis program (integral to the validation program or external with data imported into the validation program) receiving a digitized image of a field of view of the slide mounted biological sample, automatically analyzes the image to determine if sufficient tissue is present within the imaged sample portion to be included in further analysis. In some embodiments, the image of the sample portion is analyzed to determine a percent tissue present in the sample portion.

In some embodiments, the signal intensity for each pixel in an acquired sample image, such as a grayscale value between 0 and 255 for each pixel is determined. In a multiplexed assay an image may be acquired for one or more of each signal (i.e., each fluorescent channel) and the signal intensity for each pixel in an acquired sample image is determined. For each, the resulting pixel intensity values are binarized, for example pixel intensities above a threshold value (e.g., 128) are identified as positive or "on," whereas pixel intensities below the threshold value are identified as negative or "off." In a binarized image, the positive pixels associated with a tissue being present are set to a common value (e.g., white or 255) and negative pixels are set to another common value (e.g., black or 0). In some embodiments using colored pixels, the pixel intensity values are binarized to one of two different colors (e.g., red and green).

A percent area can be determined by calculating the total number of positive pixels divided by the total number of pixels in the field of view. The automated validation process identified those samples with insufficient tissue, for example a percent area not meeting the predetermined threshold criteria. In some embodiments, one or more user settable criteria, such as the percent tissue sample present, may be set by the user i.e., in a dialog box of a workstation-implemented embodiment of the automated validation process, or may be preset in the program. Preferably this assessment is conducted on a marker and related signal that is known to be reasonably homogeneously expressed in the tissue of interest.

Figures 10, 11:
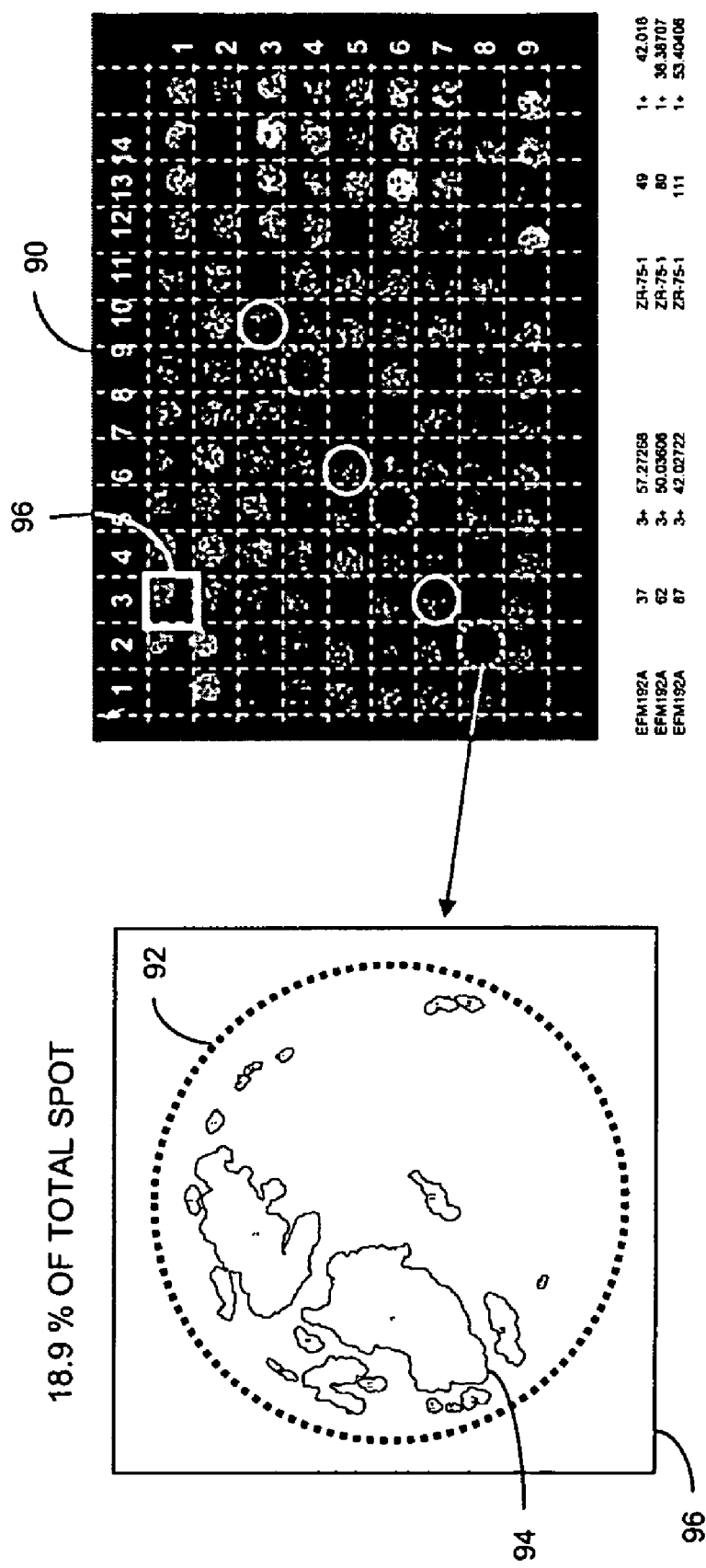
FIG. 10 is an image of an exemplary imaged TMA sample identifying an array of fields of view for each spot in the array.
FIG. 11 is an illustration of tissue present within one of the spots of the TMA sample of FIG. 10.

One example of the tissue sufficiency determination is shown in the FIG. 10 and FIG. 11. An image of a TMA slide 90 is shown including 14 columns and 9 rows of sample histospots stained for cytokeratin to identify epithelial cells. Such a staining process can be used to differentiate tumor tissue from stroma in a biopsy sample. The treated TMA slide 90 can be portioned into smaller regions, such as those identified by the dashed grid. An image of each sample 96 at a higher magnification is acquired and the image processor binarizes the pixels of the image based upon signal intensity and identifies the number of positive pixels. The image process then calculates the percent area positive, in this case for cytokeratin staining. The percent tissue present in this example is 18.9%. Whether this ratio of tissue in the sample is sufficient depends upon a definable tissue sufficiency threshold. The validation program accessed this data and identified those samples not meeting established criteria, for example 1, 5, 10, 20% tumor tissue, ideally 5% tumor tissue. In some embodiments, the results of the analysis are tracked per sample spot. Alternative or in addition, the fields of view 96 can be marked in the image file to indicate passing (solid circle drawn about the sample spot) or failed (dashed circle drawn about the sample spot). Similarly this analysis can be performed for percent cell nuclear area present. Samples identified as having insufficient tissue of interest by the above criteria were considered inadequate or inappropriate samples for further data analysis and are therefore excluded from the data set.

Tissue Sample Position

Figure 12:
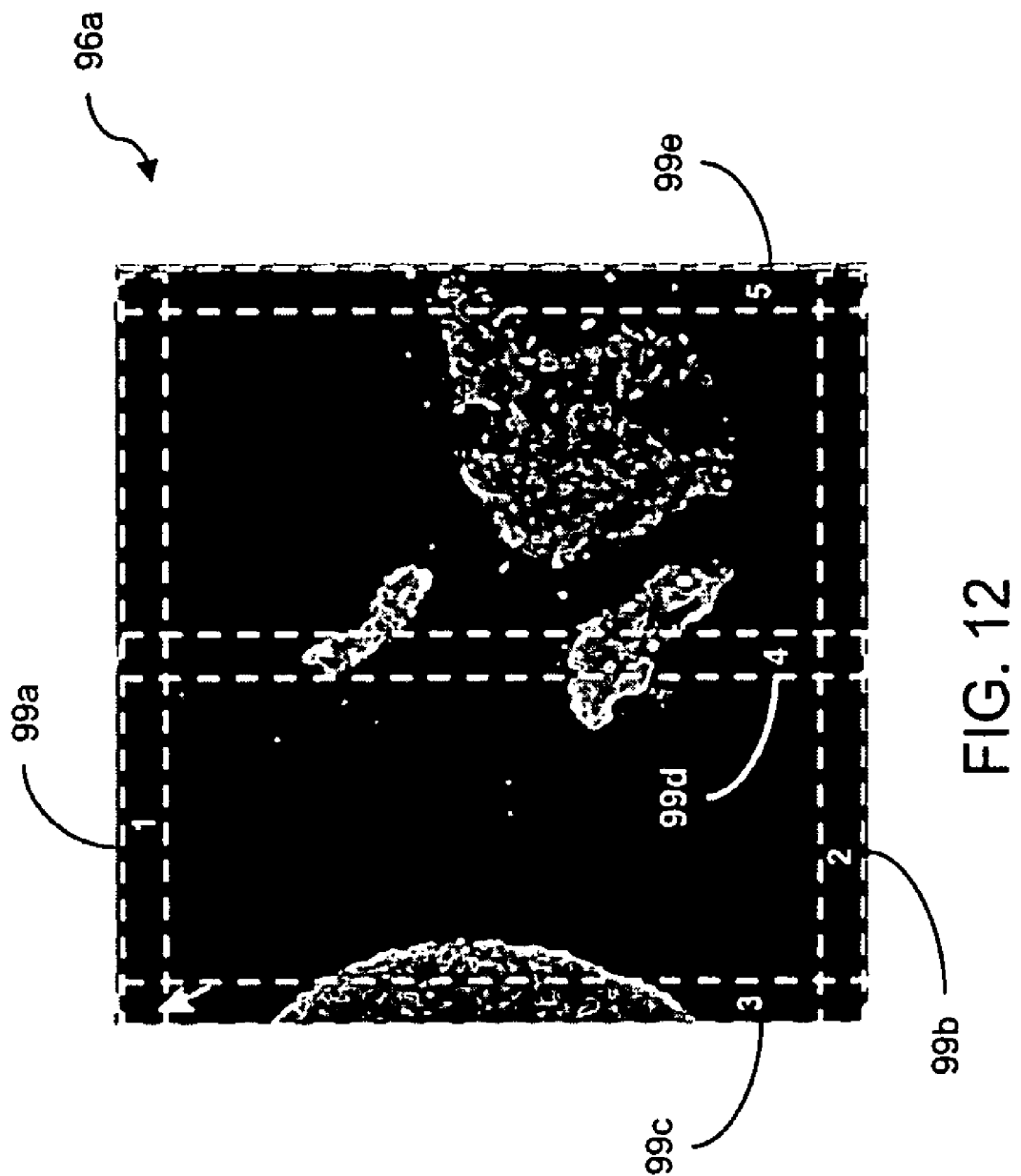
FIG. 12 is an exemplary field of view including multiple cross-sections defined through the field of view according to principles of an embodiment of the invention.

For TMAs the automated validation process identifies images acquired when tissue samples were not correctly positioned in the field of view 96. In particular, an image analysis program of the automated validation process calculates the average pixel intensity in each of multiple different sections identified within the field of view 96. For example, referring to FIG. 12, up to five sections are identified in an exemplary field of view 96a. In some embodiments more or less than five sections can be included. For example, only four different sections can be used, without having the center field.

Continuing with the exemplary embodiment, a first section 99a is defined as a thin horizontal rectangle along a top edge of the rectangular field of view 96a. A second section 99b is defined as a thin horizontal rectangle along a bottom edge of the rectangular field of view 96a. A third section 99c is defined as a thin vertical rectangle along a left edge of the rectangular field of view 96a. A fourth section 99d is defined along as a thin vertical rectangle in the middle of the rectangular field of view 96a. And, a fifth section 99e is defined as a thin vertical rectangle along a right edge of the rectangular field of view 96a. The area of each of the sections 99a, 99b, 99c, 99d, 99e (generally 99) can be defined. For example, the area of each of the vertical rectangles 99c, 99d, 99e in the exemplary embodiment is determined as about 5% of the width of the image multiplied by a full length through the field of view. Similarly, the area of each of the horizontal rectangles 99a, 99b is determined as about 5% of the length of the image multiplied by a full width through the field of view.

Thus, in the exemplary embodiment, the sections 99 included each of the peripheral edges (four peripheral sections) of the image. The image analysis program then identifies whether signal is present in all four edge-cross sections simultaneously, which may indicate an image of a TMA histospot sample not correctly aligned in the field of view. The image analysis program may also identify whether signal is present in all four edge-cross sections, or is missing signal in the central section in which may indicate an image of more than one sample in the field of view, or a split image (indicating that two spots could potentially be present in the same field of view 96a). Images of such misaligned samples are either removed from further analysis or flagged for review or cropping before further analysis. For such purposes, the signal evaluated in the cross sections can be continuous, or binarized. Furthermore, for samples stained with multiple stains, i.e. three color fluorescently stained specimens, this analysis can be performed by measuring the signal associated with any one of the stains. In a preferred embodiment the signal associated with a stain most uniformly present in a tissue section is used.

Figures 13A, 13B, 13C:
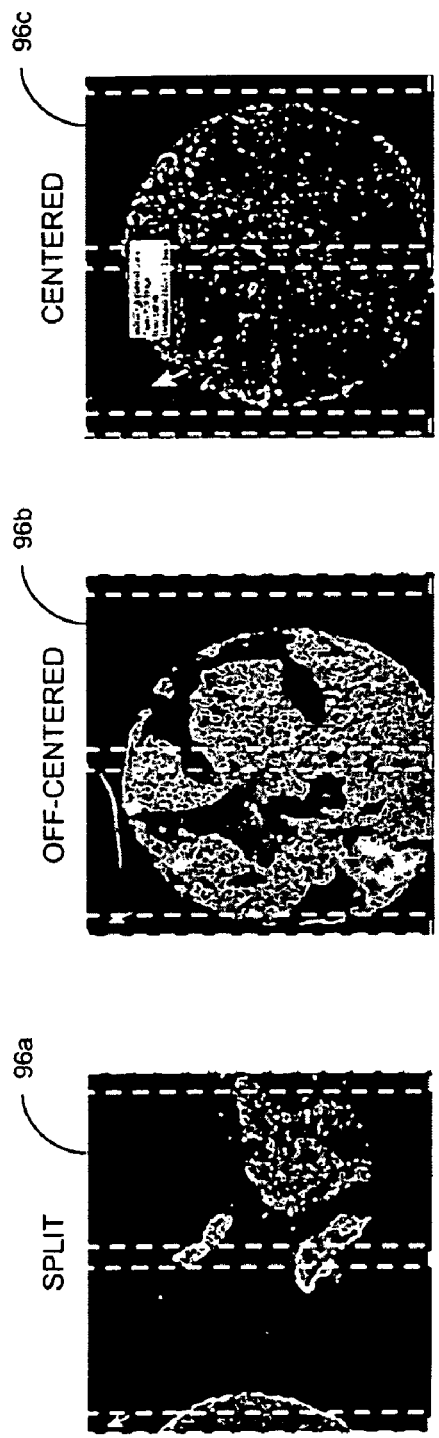
FIG. 13A is an exemplary field of view including an unacceptable split spot overlaid with vertical cross-sections.
FIG. 13B is an exemplary field of view including an off-centered spot overlaid with vertical cross-sections.
FIG. 13C is an exemplary field of view including a centered spot overlaid with vertical cross-sections.
Figure 14:
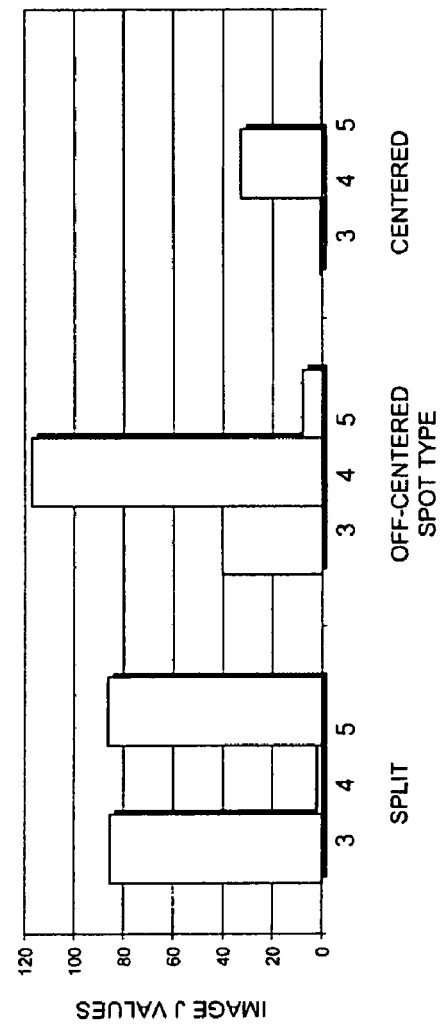
FIG. 14 is a graphical representation of a signal within the vertical cross-sections of FIG. 13A, FIG. 13B and FIG. 13C for horizontal positional analysis in accordance with the present invention.

To facilitate tissue sample position analysis, intensities representative of two or more different sections of each test sample can be determined and then plotted for comparison. The exemplary field of view 96a is redrawn in FIG. 13A with the three vertical sections 99c, 99d, 99e. The resulting intensity values in each of the three different sections 99c, 99d, 99e, referred to respectively as 3, 4, 5 are plotted below in FIG. 14. The resulting pattern reflects two higher intensity bars for the peripheral sections 3 and 5, and a lower intensity bar in between for the central section 4. Such a pattern with the edges being greater than the center is indicative of a split spot. An example of an off-centered spot, skewed to the left edge is shown in FIG. 13B. The resulting pattern reflects one central section (i.e., section 4) and one peripheral section (i.e., section 3) having higher intensity that the other peripheral section (i.e., section 5). A centered spot is shown in FIG. 13C. The resulting pattern reflects one central section (i.e., section 3) having substantially higher intensity and a lower and relatively equal intensity distributed in the peripheral sections (i.e., sections 3 and 5).

In some embodiments, this analysis can be carried out by plotting values representative of the intensities similarly to that done for the determination of staining positional bias (described above). This assessment can be done measuring the intensity of one or more stains in the specimen. Ideally a stain that is relatively uniformly expressed throughout the tissue of interest is used. For example a stain indicative of epithelial tissue, or tumor tissue such as an anti-cytokeratin stain may be used. Variations in the stain intensity may be restricted to a limited number of variation levels. For example, the variations can be limited to one of two values in a binarized assessment scenario. The spots identified as not being centered in the field of view, may optionally be manually reviewed for confirmation and also possibly for operator intervention to crop the image such that it only contains one sample and is then retained for further analysis. Alternatively the image may be rejected and excluded from the data set for further analysis.

Signal Saturation Assessment

In some embodiments, a determination of the percent pixel intensity saturation present in each field of view is automatically determined by an image analysis program of the automated validation process. This assessment can be integral to the validation program or done by an external analysis program and imported into the validation program. Acquired images of tissue sections or TMA histospots containing a number of pixels having saturated intensity values, the number of pixels exceeding a threshold value are automatically identified. As with any of the thresholds defined herein, this saturation threshold value can be set by the image analysis program or set externally by a user. This analysis is done in particular for all stains (for example fluorophores acquired in their respective channels) that will be subjected to further quantitative analysis and identifies specimen images that are inappropriate for such analysis.

Results can be displayed as percent saturated pixels in each spot for the particular stain. A saturated pixel intensity is represented by a maximum intensity value or intensity range. Such a maximum intensity value may be 255 (e.g., white) for an exemplary 8-bit intensity scale (0-255). In some embodiments, a saturated range may be represented for image intensity values above 245. For example in an image of a sample stained for cytokeratin and the nucleus to identify cellular compartments, pixel saturation may be set at a limit, such, for example, a 1, 2, 3, 4, 5, 6, 7, 8, 9, 10% limit. In a preferred embodiment 4-5% pixel saturation was determined to be the limit. In the same sample also stained for a target of interest (for example HER2, ER, PR), a low limit for pixel saturation should be set, for example, 0, 1, 2, 3, 4, and 5. In a preferred embodiment <1% pixel saturation was determined to be the limit.

Figure 15:
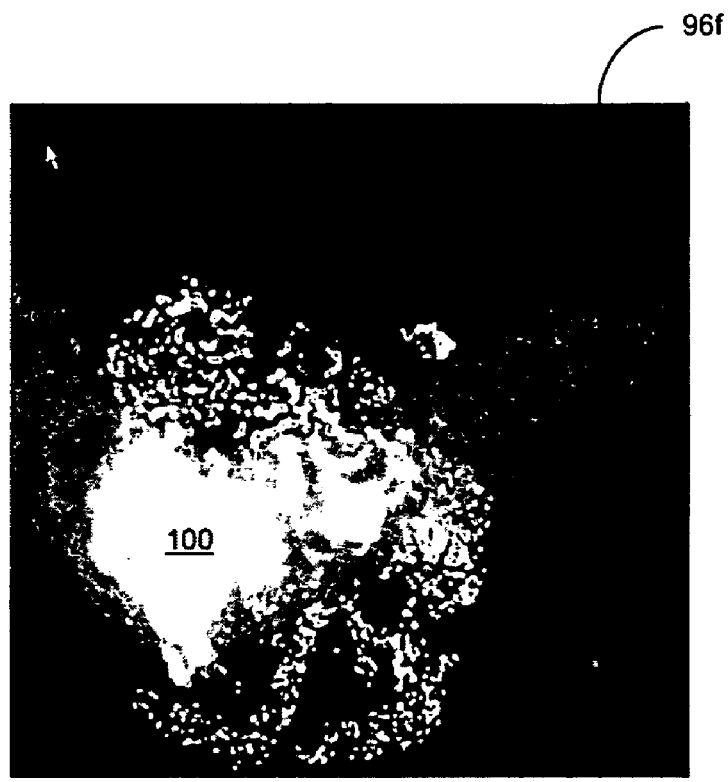
FIG. 15 is an exemplary field of view including a sample spot illustrating unacceptable pixel saturation.
Figure 16:
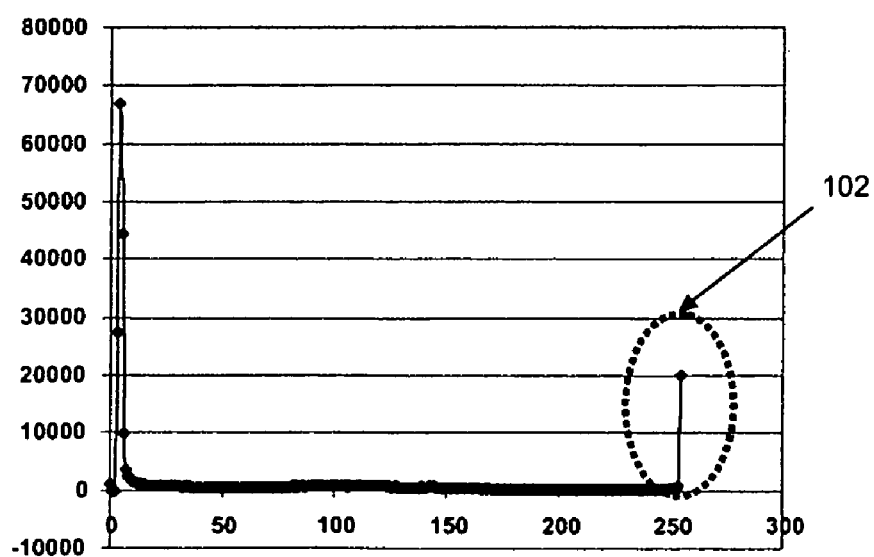
FIG. 16 is graph of pixel intensities of the exemplary image of FIG. 15.

This method also provides for identifying images of specimens containing fluorescing artifacts that should be excluded from further data analysis. An example of a field of view 96f of a stained TMA histospot with fluorescing artifacts 100 is illustrated in FIG. 15. Such artifacts 100 may result from one or more of nuclear debris, overlapping cells, or extraneous material present in the sample or even mounting media. A frequency distribution of intensity for the exemplary imaged field of view 96f is depicted graphically in FIG. 16. A histogram of pixel intensity values for the image reveals a peak value at the highest intensity value (250). Such a peak is indicative of pixel saturation. If a significant number of pixels fall within the maximum intensity range the imaged field of view 96f is identified or otherwise flagged as exceeding signal saturation thresholds. The flagged sample may be excluded from further analysis or subject to manual inspection before such a determination is made.

Focus Assessment

In some embodiments, a determination of in or out of focus of each field of view is automatically determined by an image analysis program of the automated validation process. Out of focus images may result from a sample being poorly focused prior to image acquisition. Alternatively, only a portion of an image being out of focus may indicate a folded tissue sample. In either instance, an out-of-focus condition can be used to identify or otherwise flag the image to exclude it from further analysis or at least to subject it to further inspection. This assessment can be integral to the validation program or done by an external analysis program and imported into the validation program. The image analysis program automatically identifies out-of-focus fields of view automatically for example, by analyzing pixel intensity values.

In some embodiments a kurtosis value is determined for the pixel intensity values of an image. The staining intensity values of pixels in a digitized image can be plotted in a histogram. The distribution can be analyzed as an indication of focus. An in focus image will typically have a pixel intensity distribution with a relatively sharp, defined peak (higher kurtosis) compared to an out of focus image which will have a pixel intensity distribution with a flattened peak (lower kurtosis). The sharpness or flatness of such a distribution can be represented in a single value, such as a kurtosis value. A higher kurtosis value is indicative of a relatively sharp defined peak; whereas, a lower kurtosis value is indicative of a flattened peak.

Kurtosis is a measure of whether the data are peaked or flat relative to a normal distribution. That is, data sets with high kurtosis tend to have a distinct peak near the mean, decline rather rapidly, and have heavy tails. Data sets with low kurtosis tend to have a flat top near the mean rather than a sharp peak. For univariate data $Y_1, Y_2, \ldots, Y_N$, the formula for kurtosis is:

$$\text{kurtosis} = \frac{\sum_{i=1}^{N}(Y_i - \overline{Y})^4}{(N-1)s^4}$$

where $\overline{Y}$ is the mean, s is the standard deviation, and N is the number of data points. Excess kurtosis can be defined as $$\text{kurtosis} = \frac{\sum_{i=1}^{N}(Y_i - \overline{Y})^4}{(N-1)s^4} - 3$$

so that the standard normal distribution has a kurtosis of zero. Positive kurtosis indicates a "peaked" distribution and negative kurtosis indicates a "flat" distribution.

Figure 17:
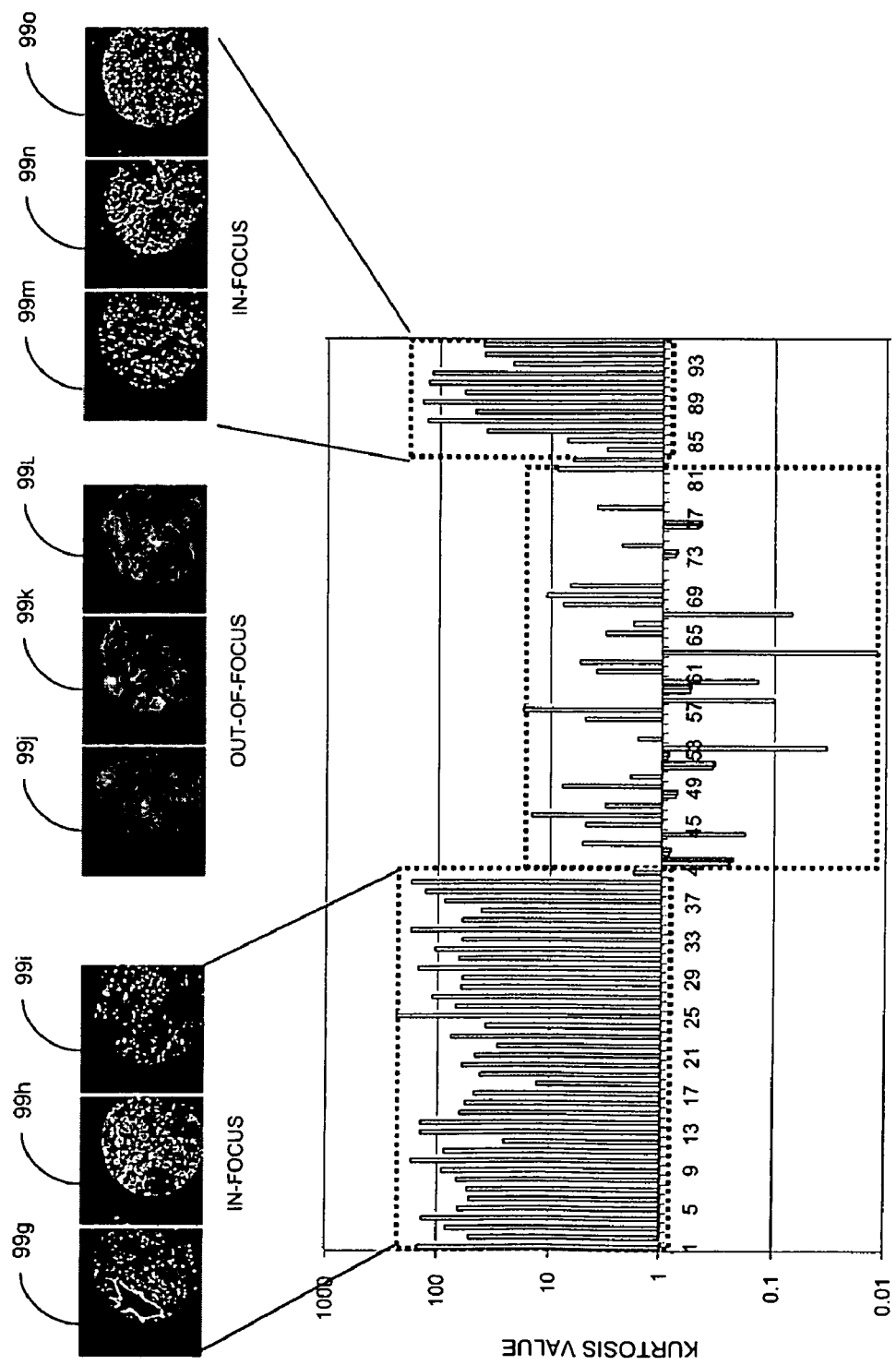
FIG. 17 illustrates a plurality of in-focus and out-of-focus field of view images in relation to graphical results of an analytical focus assessment.
Figure 18:
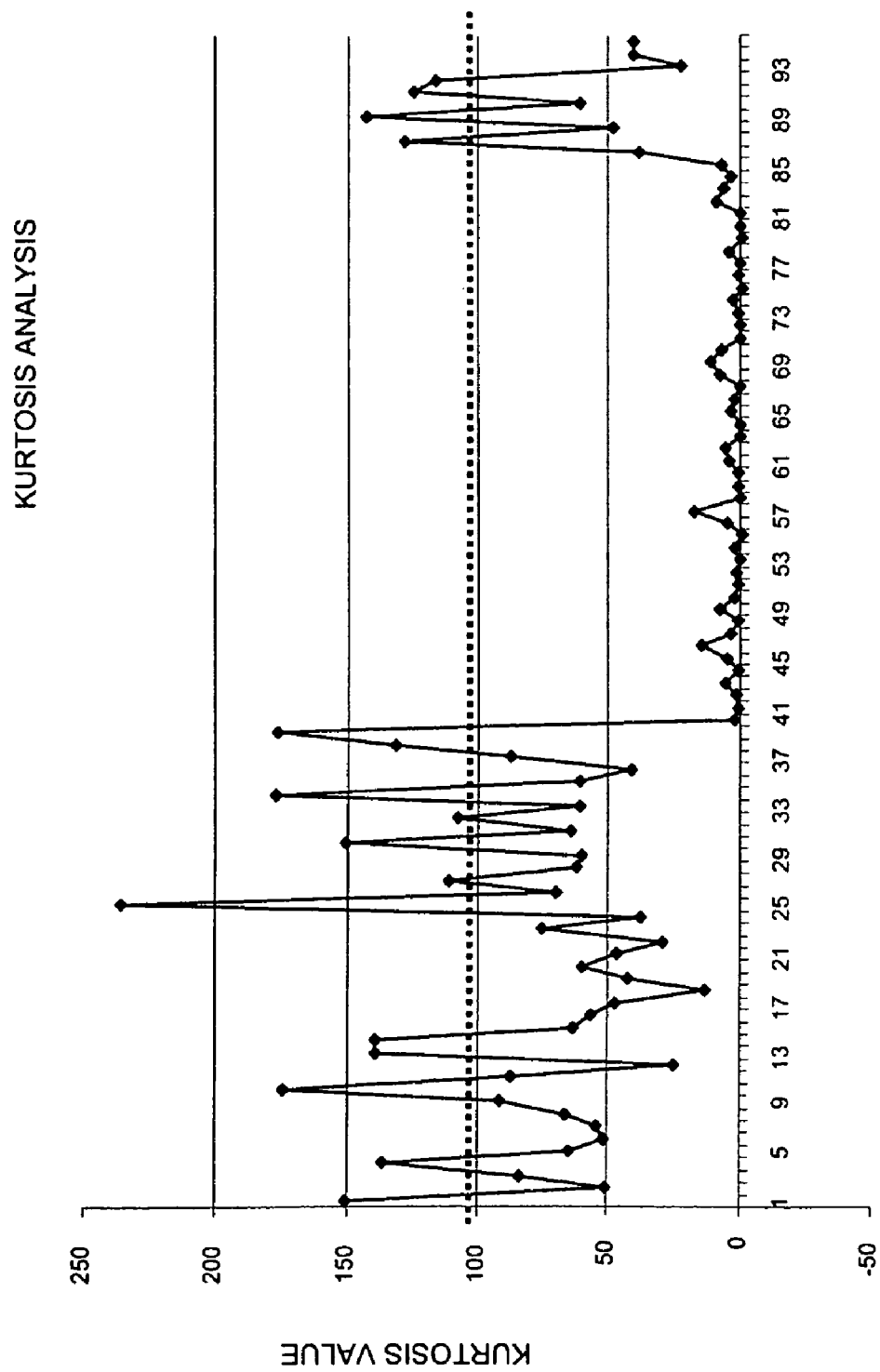
FIG. 18 is a graph illustrating results of an analytical focus assessment.

A demonstration of the use of kurtosis values to identify acquired images of out-of-focus specimens is shown in FIG. 17. Images of collection of histospots in a TMA were imaged with specimens intentionally in focus (i.e., 99g, 99h, 99i), intentionally out-of-focus (99j, 99k, 99l) then in focus (99m, 99n, 99o). A kurtosis values is determined for each of the imaged TMA histospots and are plotted in FIG. 17 in order of acquisition. In focus images have a higher kurtosis value than out of focus images. Those that have a kurtosis above an established cut-off are presumed to be in-focus, whereas those having a kurtosis value below the established cut-off value may be flagged for manual review or excluded from further analysis. In a preferred embodiment, Kurtosis values below 10 are clearly out-of-focus images or images with very low contrast (low signal-to-noise ratio). The first and last series of three images, 99g, 99h, 99i and 99m, 99n, 99o are substantially in focus and are above the kurtosis value established cutoff value. The series of the second three imaged fields of view 99j, 99k, 99l, which are substantially out-of-focus fall below the kurtosis value established cutoff value. Thus, the image analysis program identifies these images as either out-of-focus or having unacceptably low contrast and either removes them from further analysis or flags them for further review. The kurtosis values may be plotted on a logarithmic scale (FIG. 17) or a linear scale (FIG. 18).

Signal Intensity

The automated validation process can include an image-processing program that sorts the signal intensity data measured from images acquired in each relevant channel for each spot. The program identifies or otherwise flags a percentage of samples having the lowest staining intensity. The particular percentage of samples to be so identified can be determined by a user or fixed in the image-processing program. These samples are considered to have inadequate staining for evaluation and are rejected and excluded from the data set for further analysis. For example, the lowest 1, 5, 15, 15, 20 or 25% may be excluded. In a preferred embodiment, the lowest 10% are excluded.

Results

An exemplary step-by-step process for an automated validation process in accordance with an exemplary embodiment of the invention is included. As a first step, the automated validation process received an electronic image of a magnified portion of a slide-mounted biological specimen. The electronic image may be in the form of an image file. Once received, the image file is accessed for further analysis by an image-processing program. In some embodiments, the automated validation process is user controllable. In some embodiments, a user may set one or more parameters to control which quality assess are performed. Alternatively or in addition, the user may set one or more parameters to control respective quality threshold values of the one or more quality indicators. For example, a user may choose to select an acceptable percent tissue area as greater than about 5%, an acceptable compartment value of 10%, an acceptable pixel saturation value of less than about 5%, a minimum acceptable nuclear/cytoplasm ratio of about 1.5. In alternative embodiments, one or more of the above parameters may be pre-specified or hard coded into the software for a specific assay.

Figure 19A:
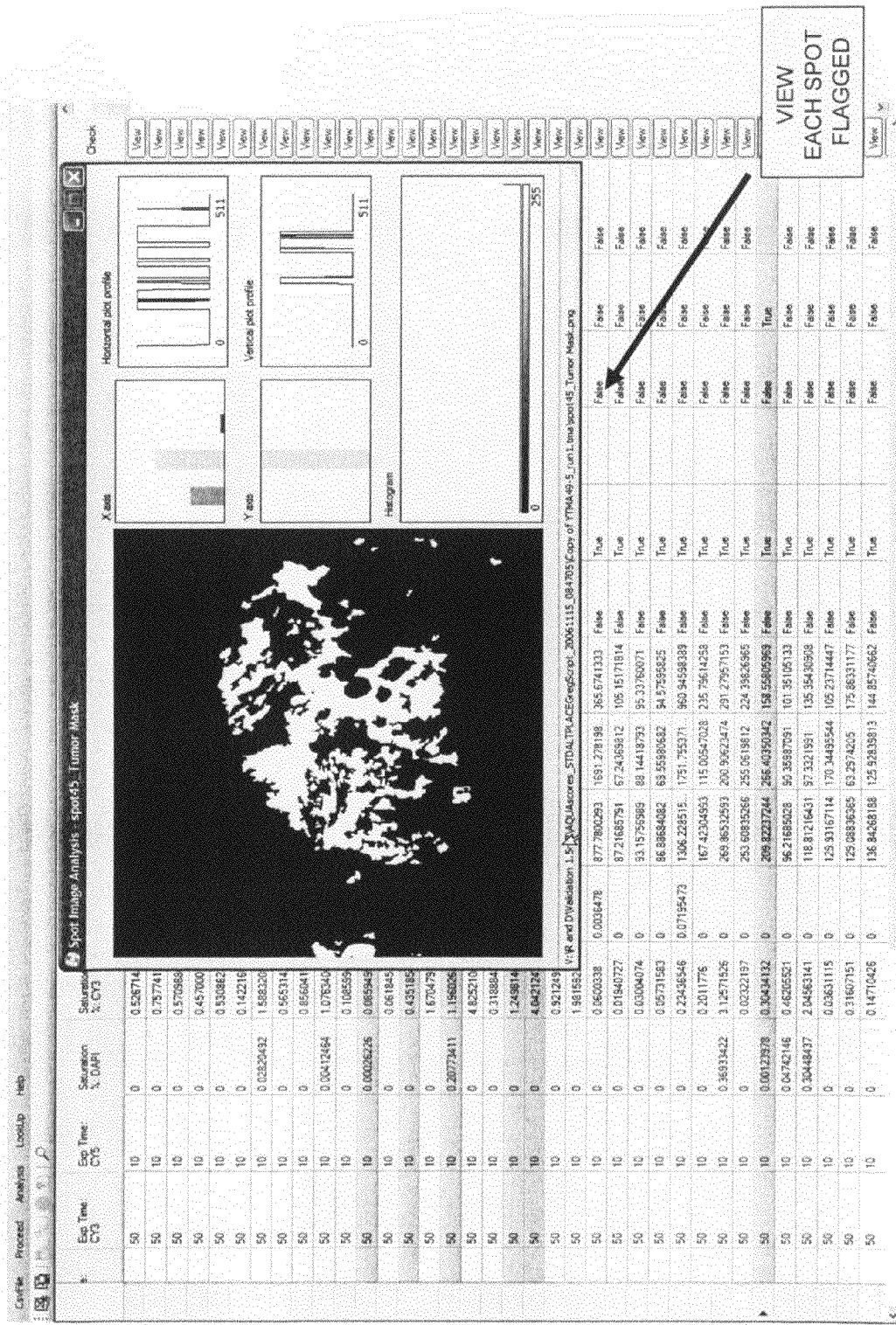
Figure 19B:
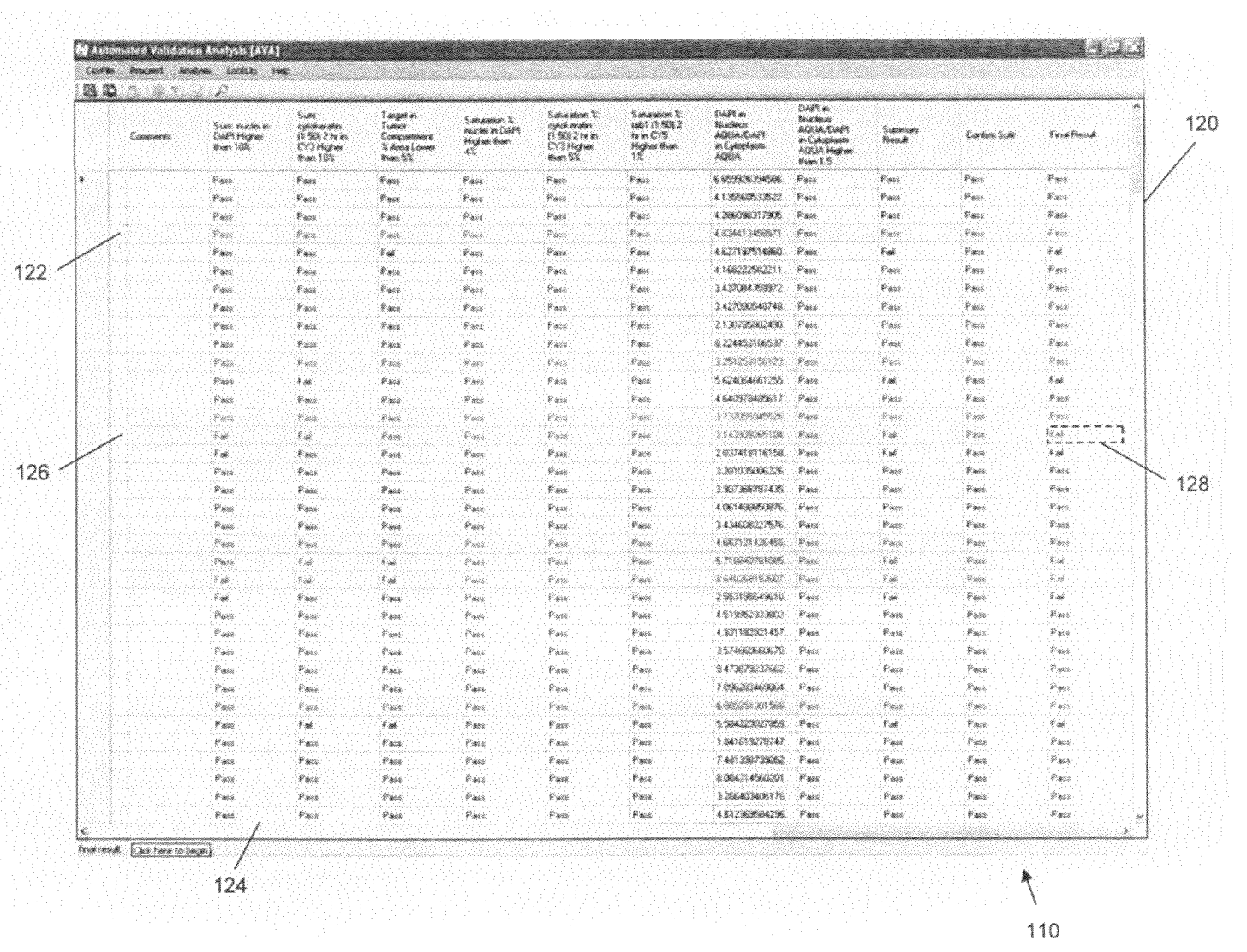

Once the image file has been accessed and the appropriate parameters and thresholds set, a program implementing the automated validation process is run to identify failed spots. Screen shots are shown in FIG. 19A and FIG. 19B of a user's display results of an exemplary validation process on a workstation. The display includes a first window 110 including tabulated results for each of the sample fields of view or histospots. In the present example, each row 122 of a table 120 is related to a respective histospot. The table 120 includes one or more columns 124, with each column including indicators or flags associated with a respective one of the one or more criteria evaluated. The results for a given spot 126 may be indicated as "true" or "false" entries in respective columns for each of the respective criteria. A final result 128 is included in one of the columns (e.g., a right hand column) to provide an overall assessment. The final result 128 can take into account entries in all of the columns for a given spot 126 and can be defined as a combination of the pas/fail results for each of the different functions. For example, the final result 128 can be failing if a histospot 126 has failed any one or more of the individual functions and passing only if the histospot has passed all functions. One or more additional windows can be selectively opened by a user to allow further examination of any of the results.

For example, a user may select an option to review failed histospots. Failed histospots can be identified on the main results page. Images can be linked to the failed results to allow for user review of the image. The images and associated results can be displayed in one or more separate windows when operating in a windows environment. Thus, images of the partial results, such as binarized images and kurtosis values can be saved, at least for flagged samples, to allow for later operator review. Optionally, the program may provide for operator review and allow an operator to over ride the automated pass/fail assignment for each sample field of view. The final results may include an output file with pass/fail results for each spot or sub-region of an entire tissue sample.

Examples—Manual vs. Automated Validation

A breast carcinoma TMA containing 1692 tissue spots on 5 slides was stained for analysis using the AQUA® biomarker scoring system. The staining protocol involved deparafinization in xylene, rehydration through a series of decreasing amounts of ethanol to pure water, and antigen retrieval in Tris EDTA. After endogenous peroxidase blocking and blocking with Background Sniper (Biocare Medical, Concord Calif.), target specific reagents to: HER 2, polyclonal (Dako, Carpinteria, Calif.), Estrogen receptor (ER), Clone 6F11 (Novocastra, SOURCE) or Progesterone Receptor (PR) Clone PgR636 (Dako) and compartment specific antibody to cytokeratin (Rabbit, Dako) each diluted in Da Vinci Green (Biocare Medical) were applied, incubated for 1 hour then rinsed off. Envision anti-mouse (Dako) and Alexa 555 GAR (Molecular Probes, Eugene Oreg.) were then applied. After extensive washing, TSA Cy 5 tyramide (NEN, Perkin Elmer, Waltham, Mass.) was applied. The slides were then washed in TBS/Tween 20. Finally, Prolong Gold antifade reagent with DAPI (Molecular Probes) mounting media was applied and the slides were dried.

Analysis of TMA Stained with HER2

The validation method of an embodiment of the current invention was used to check the quality of the data set compared to manual methods (see Table 1). The results of the two validation methods agreed for 80% of the tissue samples (i.e., both manual and automated evaluation marked tissue spot as failed, or both marked tissue as passed). Auto validation failed 15% tissue spots that manual review passed. Often these tissue spots either had low amounts of tissue present or low levels of staining, both criteria that are difficult to judge manually. Upon subsequent manual review of these spots, the reviewer agreed with the auto validation results. Importantly, auto validation passed very few tissue spots (4.2%) that were failed by manual validation.

TABLE 1

Automated vs. Manual Results of TMA Stained with HER2

| HER2 STAINING | SLIDE NO. | | | | | |
| --- | --- | --- | --- | --- | --- | --- |
| | 9 | 10 | 11 | 12 | 12b | Total |
| Total Number of Spots | 520 | 520 | 520 | 100 | 32 | 1692 |
| Auto validation "Fail" Manual validation "Pass" | 87 16.7% | 61 11.7% | 85 16.4% | 16 16.0% | 5 15.6% | 254 15.0% |
| Auto validation "Pass" Manual validation "Fail" | 28 5.4% | 22 4.2% | 21 4.4% | 0 0% | 0 0% | 71 4.2% |
| Both marked "Fail" | 32 6.2% | 38 7.3% | 37 7.1% | 1 1.0% | 5 15.6% | 113 6.7% |
| Both marked "Pass" | 373 71.7% | 399 76.7% | 377 72.5% | 83 83.0% | 22 68.8% | 1254 74.1% |
| Total matching evaluations | 405 77.9% | 437 84.1% | 414 79.6% | 84 84.0% | 27 84.4% | 1367 80.8% |

Analysis of TMA Stained with ER

The validation method of an embodiment of the current invention was used to check the quality of the data set compared to manual methods (see Table 2). The results of the two validation methods agreed for 77.5% of the tissue samples (i.e., both manual and automated evaluation marked tissue spot as failed, or both marked tissue as passed). Auto validation failed 12.8% tissue spots that manual review and passed and passed 10.3% tissue spots that manual review failed. Often these tissue spots either had low amounts of tissue present or low levels of staining, both criteria that are difficult to judge manually. Upon subsequent manual review of these spots, the reviewer agreed with the auto validation results.

TABLE 2

Automated vs. Manual Results of TMA Stained with ER

| ER Staining | SLIDE NO. | | | | | | |
|---|---|---|---|---|---|---|---|
| | 1 | 2 | 3 | 3b | 4 | 4b | Total |
| Total Number of Spots | 520 | 520 | 208 | 312 | 100 | 32 | 1692 |
| Auto validation "Fail" | 100 | 37 | 31 | 29 | 13 | 6 | 216 |
| Manual validation "Pass" | 19.2% | 7.1% | 10.1% | 9.3% | 13.0% | 18.8% | 12.8% |
| Auto validation "Pass" | 38 | 60 | 30 | 36 | 7 | 4 | 175 |
| Manual validation "Fail" | 7.3% | 11.5% | 14.4% | 11.5% | 7.0% | 12.5% | 10.3% |
| Both marked "Fail" | 56 | 102 | 56 | 34 | 9 | 4 | 261 |
| | 10.8% | 19.6% | 26.9% | 10.9% | 9.0% | 12.5% | 15.5% |
| Both marked "Pass" | 326 | 321 | 101 | 213 | 71 | 18 | 1050 |
| | 62.7% | 61.7% | 48.6% | 79.2% | 71.0% | 56.3% | 62.1% |
| Total matching evaluations | 382 | 423 | 157 | 247 | 80 | 22 | 1311 |
| | 73.5% | 81.4% | 75.5% | 79.2% | 80.0% | 68.8% | 77.5% |

Analysis of TMA Stained with PR

The validation method of an embodiment of the current invention was used to check the quality of the data set compared to manual methods (see Table 2). The results of the two validation methods agreed for 80.8% of the tissue samples (i.e., both manual and automated evaluation marked tissue spot as failed, or both marked tissue as passed). Auto validation failed 11.9% tissue spots that manual review passed. Often these tissue spots either had low amounts of tissue present or low levels of staining, both criteria that are difficult to judge manually. Upon subsequent manual review of these spots, the reviewer agreed with the auto validation results. Importantly, auto validation passed very few tissue spots 7.3% that were failed by manual validation.

TABLE 3

Automated vs. Manual Results of TMA Stained with PR

| PR STAINING | SLIDE NO. | | | | | |
|---|---|---|---|---|---|---|
| | 5 | 6 | 7 | 8 | 8B | TOTAL |
| Total Number of Spots | 520 | 520 | 520 | 100 | 32 | 1692 |
| Auto validation "Fail" | 70 | 56 | 59 | 13 | 4 | 202 |
| Manual validation "Pass" | 13.5% | 10.8% | 11.4% | 13.0% | 12.5% | 11.9% |
| Auto validation "Pass" | 50 | 47 | 21 | 3 | 2 | 123 |
| Manual validation "Fail" | 9.6% | 9.0% | 4.0% | 3.0% | 6.3% | 7.3% |
| Both marked "Fail" | 71 | 76 | 41 | 5 | 4 | 197 |
| | 13.7% | 10.8% | 7.9% | 5.0% | 12.5% | 11.6% |
| Both marked "Pass" | 329 | 361 | 388 | 79 | 22 | 1179 |
| | 63.3% | 69.4% | 74.6% | 79.0% | 68.8% | 69.7% |
| Total matching evaluations | 400 | 417 | 440 | 84 | 26 | 1367 |
| | 76.9% | 80.2% | 84.6% | 84.0% | 81.3% | 80.8% |

Integrated Automated Validation and Image Analysis and Whole Tissue Section Example.

An alternative method to the implementation of this invention is integrated automated validation and image analysis. This process can include any and all of the validation procedures previously detailed in a single integrated software package. As a first step, the integrated automated validation and image analysis process receives an electronic image of a magnified portion of a slide-mounted biological specimen. This electronic image file may be of a single image, a series of single images, or a composite of several images. Once received, the image filed is opened for further analysis by the integrated automated validation and image analysis program. In some representations of the system, the automated validation process begins with image quality validation. This validation assessment includes but is not limited to parameters such as saturation assessment, out of focus assessment. This parameters may or may not have user defined limits. The integrated program then continues to image analysis and validations that are analysis dependent. This validation assessment includes but is not limited to parameters such as percent tissue area and signal to background separation analysis. As with previous parameters, these assessments may or may not have user defined limits. In alternative embodiments, one or more of the above parameters may be pre-specified or hard coded into the software for a specific assay. One or more of the configurable thresholds, limits, or settings can be user defined, hardcoded, or a combination of user defined and hardcoded. Also, the parameters can be assessed in any particular order. In some embodiments, parameters are assessed sequentially. Alternatively or in addition, at least some parameters are assessed in parallel.

Examples—Automated Validation of Whole Tissue Sections (WTS)

Whole tissue sections from four breast carcinoma specimens were stained for ER (as described above) for analysis using the AQUA® scoring system. The data set for each specimen was derived from digital images collected for each field of view (FOV) of the tumor region of each WTS. As shown in Table 4, 150 FOVs were collected for specimen 1, 168 FOVs were collected for specimen 2, 172 FOVs were collected for specimen 3 and 47 FOVs were collected for specimen 4.

The validation method of an embodiment of the current invention was used to check the quality of the data set three times, each run by a different operator. In this embodiment, saturation assessment and out of focus assessment were performed first by the software. The operators then confirmed the results. Validation then continued with evaluation of percent tissue area and signal to background separation analysis. In this embodiment, all of the parameters were hard coded into the software.

The results of the validation method qualified 100, 104 or 109 FOVs (depending on operator) or 70% of the 150 collected for specimen 1; 60, 61 or 62 FOVs or 36% out of 168 for specimen 2; 70% of the 172 FOVs for specimen 3; and 15% of the 47 FOVs for specimen 4. Top three reasons for failures across the 4 slides were FOVs being out of focus; insufficient tumor tissue present and insufficient signal to background differentiation.

TABLE 4

Results of Analysis for Breast Cancer Whole Tissue Sections

| (n = 3) | Operator | Mean AQUA ® Score Per operator | #fields on tissue | #fields scored | Mean | StDev | % CV |
|---|---|---|---|---|---|---|---|
| Slide #1 | Operator 1 | 9.941 | 150 | 100 | 9.945 | 0.0047 | 0.05 |
| | Operator 2 | 9.945 | | 104 | | | |
| | Operator 3 | 9.950 | | 109 | | | |
| Slide #2 | Operator 1 | 10.382 | 168 | 60 | 10.397 | 0.0357 | 0.34 |
| | Operator 2 | 10.437 | | 61 | | | |
| | Operator 3 | 10.370 | | 62 | | | |
| Slide #3 | Operator 1 | 10.254 | 172 | 102 | 10.232 | 0.0194 | 0.19 |
| | Operator 2 | 10.216 | | 110 | | | |
| | Operator 3 | 10.227 | | 150 | | | |
| Slide #4 | Operator 1 | 13.723 | 47 | 4 | 13.818 | 0.1644 | 1.19 |
| | Operator 2 | 13.723 | | 4 | | | |
| | Operator 3 | 14.008 | | 14 | | | |

The validation method, even when run and reviewed by 3 separate operators, aided in standardizing FOVs for biomarker expression analysis by AQUA® scoring, thereby resulting in a CV of between 1.19 to 0.05%.

Various embodiments of validating a specimen for automated quantitative immunoassays have been described herein. The embodiments are given by way of example and are not intended to limit the scope of the present invention. It should be appreciated, moreover, that the various features of the embodiments that have been described may be combined in various ways to produce numerous additional embodiments. For example, in some embodiments, the system may allow certain quantitative quality indicators to be reviewed manually, while other indictors may not be available for review. Furthermore, the order in which indicators are processed and/or options for manual review provided is flexible. For example, quantitative quality indicators for which the system allows a manual review may be processed first, with the remaining indicators processed after manual review is complete.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for automatically evaluating quality of a digital image of a magnified portion of a slide-mounted tissue sample comprising:
   automatically determining at least one quantitative quality indicator of a digital image of a magnified portion of a slide-mounted tissue sample by (i) identifying a plurality of different sub-regions within the digital image, (ii) automatically determining an average pixel intensity value for pixel intensity values within each of the plurality of different sub-regions (iii) comparing between different sub-regions the average pixel intensity value determined for each of the plurality of different sub-regions; and (iv) automatically determining for each sub-region a respective image position indicator as the at least one quantitative quality indicator; and
   automatically determining whether the at least one quantitative quality indicator meets a respective minimum acceptable quality threshold, failure of the at least one quantitative quality indicator to meet its respective minimum acceptable quality threshold being indicative of the digital image of the magnified portion of the slide-mounted tissue sample as considered unsuitable for automated pathological evaluation.

2. The method of claim 1, wherein automatically determining the at least one quantitative quality indicator of the digital image further comprises automatically determining an image focus indicator.

3. The method of claim 2, wherein automatically determining the image focus indicator comprises determining a kurtosis value from pixel intensity values obtained within a region of interest of the digital image, the respective minimum acceptable quality threshold indicative of an image being in-focus within an acceptable limit.

4. The method of claim 1, wherein automatically determining the at least one quantitative quality indicator further comprises:
   automatically determining a plurality of image intensity values obtained from different coordinates across the digital image of the slide-mounted tissue sample, the image intensity values indicative of a stain intensity associated therewith; and
   automatically determining a variability in the image intensity values obtained from different coordinates across the digital image of the slide-mounted tissue sample, the respective minimum acceptable quality threshold being a range indicative of an acceptable stain variability across the digital image of the slide-mounted tissue sample.

5. The method of claim 4, wherein automatically determining a plurality of image intensity values obtained from different coordinates across the digital image of the slide-mounted tissue sample comprises summing intensity values along at least one of rows and columns of pixels of the digital image, the variability being determined from the summed intensity values.

6. The method of claim 1, wherein the digital image is a monochromatic image including a plurality of pixels, each pixel having an intensity value associated therewith indicative of a stain intensity.

7. The method of claim 1, wherein automatically determining the at least one quantitative quality indicator further comprises automatically determining a value indicative of an amount of target tissue of interest present within a region of interest of the digital image, the respective minimum acceptable quality threshold being a value indicative of a sufficient amount of target tissue of interest being present within the region of interest.

8. The method of claim 7, wherein determining a value indicative of an amount of target tissue of interest present comprises:
    automatically comparing a pixel intensity value of each pixel within the region of interest to an intensity threshold value;
    automatically binarizing pixel intensity values within the region of interest of the received digital image to one of a first value indicative of tissue presence and a second value indicative of tissue absence in response to the comparison; and
    automatically formulating a target tissue ratio as a number of pixels having the first value to a total number of pixels within the region of interest, the target tissue ratio indicative of the amount of target tissue of interest present within the region of interest of the digital image.

9. The method of claim 8, wherein at least one of the respective minimum acceptable quality threshold and the target tissue ratio are settable by a user.

10. The method of claim 1, wherein the act of automatically determining the at least one quantitative quality indicator for a digital image of a magnified portion of a slide-mounted tissue sample having been pre-treated by a stain known to be specific for a target sub-cellular compartment, comprises:
    automatically determining within a region of interest of the digital image, a first staining intensity value indicative of the stain in the target sub-cellular compartment of the tissue sample;
    automatically determining within the same region of interest, a second staining intensity value indicative of the tissue sample of the stain in a different sub-cellular compartment of the tissue sample;
    automatically determining a ratio of the first and second staining intensity values; and
    comparing the determined ratio to a minimum preferred staining ratio, the minimum preferred staining ratio being indicative of meeting the at least one quantitative quality indicator.

11. The method of claim 1, wherein automatically determining the at least one quantitative quality indicator further comprises automatically determining within a region of interest of the digital image, a portion of pixels within the region of interest having a saturated intensity value, the respective minimum acceptable quality threshold indicative of an acceptable portion of saturated pixels present within the region of interest.

12. The method of claim 1, wherein the slide-mounted tissue sample is a tissue micro-array.

13. The method of claim 1, which is performed for more than one channel of a multi-channel microscopy system.

14. A system for automatically evaluating quality of a digital image of a magnified portion of a slide-mounted tissue sample comprising:
    means for automatically determining at least one quantitative quality indicator by (i) identifying a plurality of different sub-regions within the digital image, (ii) automatically determining an average pixel intensity value for pixel intensity values within each of the plurality of different sub-regions, (iii) comparing between different sub-regions the average pixel intensity value determined for each of the plurality and (iv) automatically determining for each sub-region a respective image position indicator as the at least one quantitative quality indicator; and
    means for automatically determining whether the at least one quantitative quality indicator meets a respective minimum acceptable quality threshold, failure of the at least one quantitative quality indicator to meet its respective minimum acceptable quality threshold being indicative of the digital image of the magnified portion of the slide-mounted tissue sample as considered unsuitable for automated pathological evaluation.

15. A non-transitory computer-usable medium having computer readable instructions stored thereon for execution by a processor to perform a method for automatically evaluating quality of a digital image of a magnified portion of a slide-mounted tissue sample, wherein the instructions comprise the steps of:
    automatically determining at least one quantitative quality indicator by (i) identifying a plurality of different sub-regions within the digital image, (ii) automatically determining an average pixel intensity value for pixel intensity values within each of the plurality of different sub-regions, (iii) comparing between different sub-regions the average pixel intensity value determined for each of the plurality of different sub-regions; and (iv) automatically determining for each sub-region a respective image position indicator as the at least one quantitative quality indicator; and
    automatically determining whether the at least one quantitative quality indicator meets a respective minimum acceptable quality threshold, failure of the at least one quantitative quality indicator to meet its respective minimum acceptable quality threshold being indicative of the digital image of the magnified portion of the slide-mounted tissue sample as considered unsuitable for automated pathological evaluation.

16. A system for automatically evaluating quality of a slide-mounted tissue sample comprising:
    a microscope configured to magnify at least a portion of the slide-mounted tissue sample;
    an image sensor in optical communication with the microscope, the image sensor obtaining a digitized image of the magnified portion of the slide-mounted tissue sample; and
    a processor module in communication with the image sensor, the processor module configured to automatically determine at least one quantitative quality indicator by (i) identifying a plurality of different sub-regions within the digital image, (ii) automatically determining an average pixel intensity value for pixel intensity values within each of the plurality of different sub-regions, (iii) comparing between different sub-regions the average pixel intensity value determined for each of the plurality of different sub-regions; and (iv) automatically determining for each sub-region a respective image position indicator as the at least one quantitative quality indicator; and to automatically determine whether the at least one quantitative quality indicator meets a respective minimum acceptable quality threshold, wherein failure of the at least one quantitative quality indicator to meet its respective minimum acceptable quality threshold being indicative of the digital image of the magnified portion of the slide-mounted tissue sample as considered unsuitable for automated pathological evaluation.

* * * * *